(12) United States Patent
Lecerf

(10) Patent No.: US 10,317,551 B2
(45) Date of Patent: Jun. 11, 2019

(54) USING SEABED SENSORS AND SEA-SURFACE REFLECTIONS FOR STRUCTURAL IMAGING OF A SUBSURFACE LOCATION IN A GEOLOGICAL FORMATION

(71) Applicant: PGS Geophysical AS, Lilleaker, Oslo (NO)

(72) Inventor: Didier B. P. Lecerf, Rio de Janeiro (BR)

(73) Assignee: PGS Geophysical AS, Oslo (NO)

(*) Notice: Subject to any disclaimer, the term of this patent is extended or adjusted under 35 U.S.C. 154(b) by 182 days.

(21) Appl. No.: 15/166,902

(22) Filed: May 27, 2016

(65) Prior Publication Data

US 2016/0349392 A1    Dec. 1, 2016

Related U.S. Application Data

(60) Provisional application No. 62/169,988, filed on Jun. 1, 2015.

(51) Int. Cl.
*G01V 1/30* (2006.01)
*G01V 1/38* (2006.01)

(52) U.S. Cl.
CPC ............ *G01V 1/308* (2013.01); *G01V 1/3852* (2013.01); *G01V 2210/612* (2013.01); *G01V 2210/6122* (2013.01)

(58) Field of Classification Search
CPC ................ G01V 1/308; G01V 1/3852; G01V 2210/612; G01V 2210/6122
USPC .......................................................... 367/21
See application file for complete search history.

(56) References Cited

U.S. PATENT DOCUMENTS

| 4,970,697 A * | 11/1990 | Earley .................. G01V 1/3808 181/112 |
| 7,426,438 B1 * | 9/2008 | Robertsson ............ G06Q 30/06 702/14 |
| 8,559,267 B2 * | 10/2013 | Tulett ................... G01V 1/3861 367/24 |
| 8,756,042 B2 * | 6/2014 | Tan ........................ G01V 1/282 703/10 |

(Continued)

FOREIGN PATENT DOCUMENTS

EP    2 669 714 A2    4/2013

OTHER PUBLICATIONS

Wong et al., "Least-squares reverse time migration/inversion for ocean bottom data: a case study," SEG San Antonio 2011 Annual Meeting, pp. 2369-2373. (Year: 2011).*

(Continued)

*Primary Examiner* — Daniel L Murphy

(57) ABSTRACT

The present disclosure provides a technique for marine seismic imaging that processes data acquired from two or more different seismic surveys in a combined manner to advantageous effect. The different seismic surveys may use seabed sensors at same positions on the seabed, but they may have different shot locations and may be performed at different times. In one use case, the technique may be used to image a subsurface location that is difficult to image using either survey alone. In another use case, the technique may be used to image a subsurface location under an obstruction. The technique may also be utilized to efficiently monitor a reservoir over time.

15 Claims, 29 Drawing Sheets

(56) References Cited

U.S. PATENT DOCUMENTS

| | | | | |
|---|---|---|---|---|
| 2012/0014218 A1* | 1/2012 | Houck | ............... | G01V 1/28 367/72 |
| 2013/0286777 A1* | 10/2013 | Frijlink | ............ | G01V 1/364 367/24 |
| 2014/0198605 A1* | 7/2014 | Grion | ............... | G01V 1/308 367/7 |
| 2015/0078124 A1* | 3/2015 | Lu | ...................... | G01V 1/36 367/7 |
| 2015/0362611 A1 | 12/2015 | Lecerf et al. | | |

OTHER PUBLICATIONS

Brittan et al., "Improved imaging in complex geology using separated wavefields," First Break vol. 30, Nov. 2012, pp. 83-88. (Year: 2012).*

N.D. Whitmore, et al. "Imaging of primaries and multiples using a dual-sensor towed streamer", 2010 SEG Denver Annual Meeting, pp. 3187-3192.

* cited by examiner

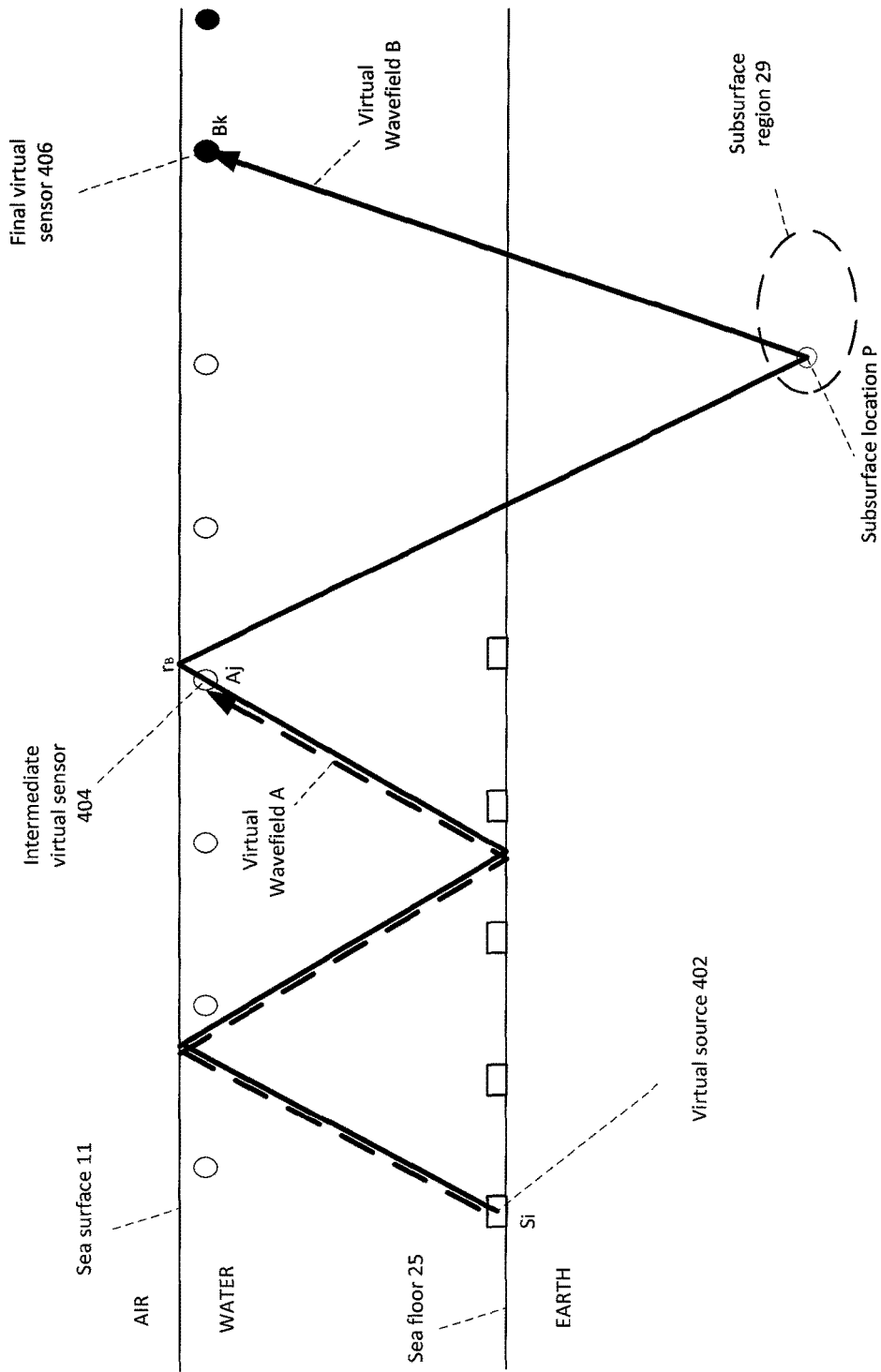

US 10,317,551 B2

USING SEABED SENSORS AND SEA-SURFACE REFLECTIONS FOR STRUCTURAL IMAGING OF A SUBSURFACE LOCATION IN A GEOLOGICAL FORMATION

CROSS-REFERENCE TO RELATED APPLICATION(S)

This application claims the benefit of U.S. Provisional Application No. 62/168,988, filed on Jun. 1, 2015, which is incorporated by reference herein in its entirety.

BACKGROUND

Geophysical surveys are often used for oil and gas exploration in geological formations, which may be located below marine environments. Various types of signal sources and geophysical sensors may be used in different types of geophysical surveys.

Seismic geophysical surveys, for example, are based on the use of acoustic waves. In a marine seismic survey, a survey vessel may tow an acoustic source (e.g., an air gun or a marine vibrator) and a plurality of streamers along which a number of acoustic sensors (e.g., hydrophones and/or geophones) are located. Alternatively, acoustic sensors may be located on the seabed rather than being towed.

Acoustic waves generated by the survey source may be transmitted to the Earth's crust and then reflected back and captured at the towed and/or seabed geophysical sensors. Data collected during a marine geophysical survey may be analyzed to locate hydrocarbon-bearing geological structures, and thus determine where deposits of oil and natural gas may be located.

BRIEF DESCRIPTION OF THE DRAWINGS

FIG. 4D depicts virtual wavefields after reversal of source and sensor definitions of FIG. 4C in accordance with an embodiment of the invention.

DETAILED DESCRIPTION

Three-dimensional (3D) seismic surveying generally uses one or more acoustic (seismic) sources and an array of acoustic (seismic) sensors. A pattern of shots is performed by the source(s). For each shot, each sensor in the array senses and records a seismic wavefield. The seismic data obtained includes multiple seismic wavefields for each of multiple shots. The seismic data may be processed to create images of a subsurface volume underneath the array of sensors.

A 3D seismic survey design includes the positions of the shots and the locations of the sensors. In the case of marine seismic surveying using seabed sensors, the locations of the sensors are fixed. In that case, the positions of the shots (the shot survey) may be designed to obtain seismic data covering the desired subsurface volume.

Four-dimensional (4D) seismic surveying involves surveying the same geological formation at different points in time. For example, 4D surveying may be used to determine changes over time in fluid saturation, pressure, and so on. Because seabed sensors are fixed-position receivers that do not change position during the seismic acquisition, they may be redeployed at the same positions at a later time so as to be advantageously used in 4D marine seismic surveying to reduce variations between surveys.

One problem or difficulty with marine seismic surveys may be caused by an obstruction that prevents positioning shots and/or sensors above a targeted sub-surface region. Such an obstruction makes it difficult to obtain seismic images of the sub-surface region under the obstruction in a conventional 3D or 4D seismic survey.

For example, a production platform may be located above the targeted sub-surface region. The production platform forms an obstruction that blocks shots from being taken at sea-surface positions in the area above the targeted sub-surface region. In the case of towed sensors, the production platform may also block sensors from being towed above the targeted region.

The present disclosure presents an innovative technique to generate seismic images by combining seismic data from different surveys. The technique has various practical applications, such as imaging under an obstruction and efficient reservoir monitoring.

Exemplary Geophysical Survey System

Figure 1:
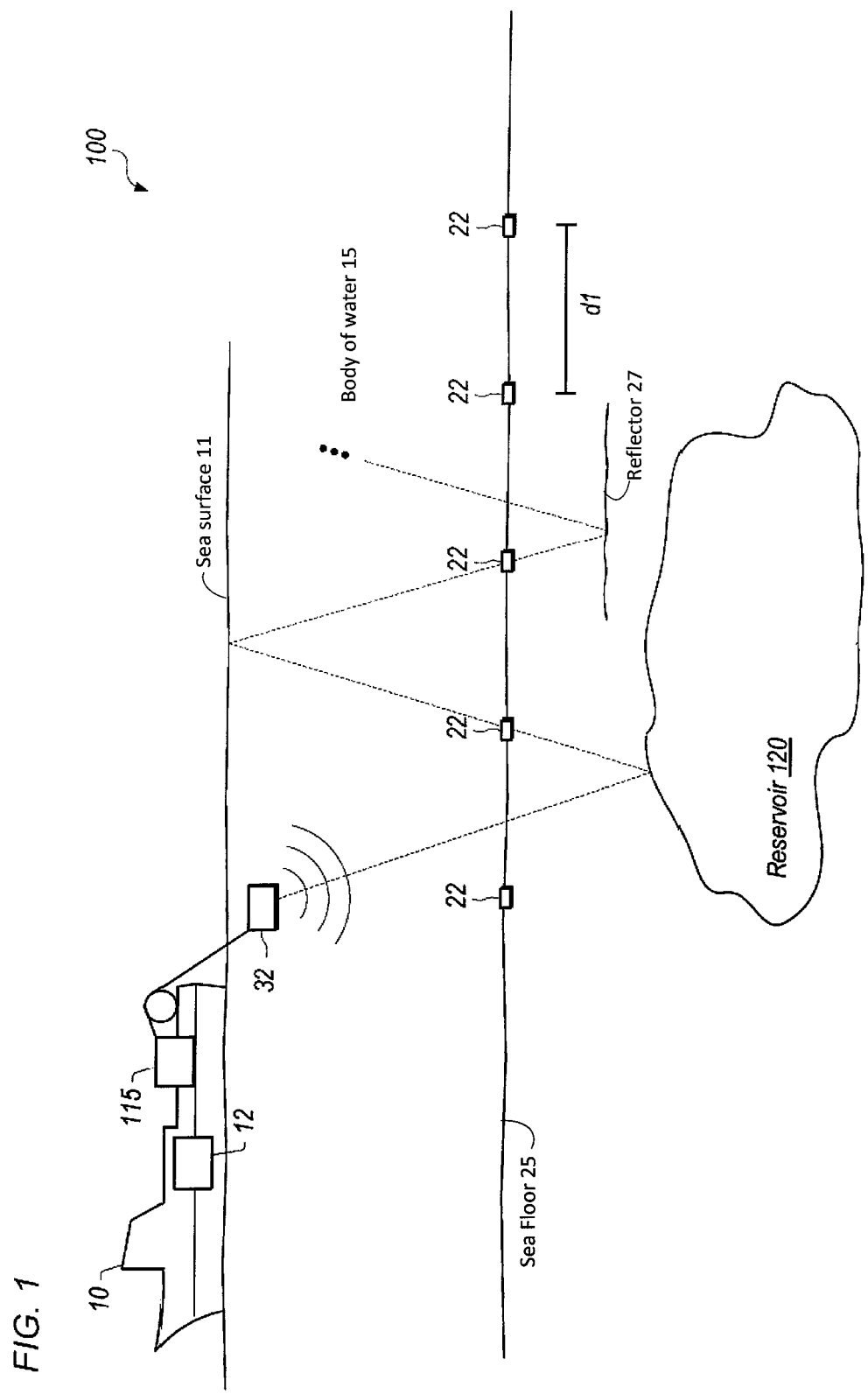
FIG. 1 is a diagram illustrating a geophysical survey system in accordance with an embodiment of the invention.

Referring to FIG. 1, a diagram illustrating one embodiment of a geophysical survey system 100 is shown. In the illustrated embodiment, the system 100 includes a survey vessel 10, signal source 32, and geophysical sensors 22.

The survey vessel 10 may be configured to move along the surface 11 of body of water 15 such as a lake or the ocean, as shown. In the illustrated embodiment, signal source 32 is configured to transmit an acoustic signal. The illustrated dashed line shows a direction of travel for a portion of an acoustic wave-front generated by signal source 32. In the illustrated embodiment, the acoustic signal proceeds through the sea floor 25 and is reflected by reservoir 120, the sea surface (an air/water interface) 11, and a reflector 27 located above reservoir 120. In other embodiments, the acoustic signal may be reflected from the sea surface multiple times (and reflected from the seabed in between the sea surface reflections).

Survey vessel 10 may include equipment, shown generally at 12 and for convenience collectively referred to as "survey equipment." Survey equipment 12 may include devices such as a data recording unit for making a record of signals generated by various geophysical sensors in the system 100. Survey equipment 12 may also include navigation equipment, which may be configured to control, determine, and record, at selected times, the geodetic positions of: survey vessel 10, signal source 32, and/or other survey elements. Geodetic position may be determined using various devices, including global navigation satellite systems such as the global positioning system (GPS), for example. In some embodiments, vessel 10 is configured to tow one or more seismic streamers (not shown).

In the geophysical survey system 100 shown in FIG. 1, survey vessel 10 tows a single signal source 32. In various embodiments, survey vessel 10 may tow any appropriate number of signal sources, including as few as none or as many as six or more. The location of the signal sources may be centered behind survey vessel 10 or displaced from the center line, and may be at various distances relative to survey vessel 10, including attached to the hull. Signal sources may be any type of signal source known in the art. Signal source 32 may include an array of multiple signal sources. For example, signal source 32 may include a plurality of seismic sources (e.g., air guns). The term "signal source" may refer to a single signal source or to an array of signal sources. For example, in the illustrated embodiment, signal sources 32 are each coupled to survey vessel 10 at one end through winch 115 or a similar spooling device that enables changing the deployed length of a signal source cable. Survey equipment 12 may include signal source control equipment (not shown separately) for selectively operating and maneuvering signal source 32. The specific configuration depicted in FIG. 1 is an example only. Other configurations may be used for the geophysical survey system.

Geophysical sensors 22 may be referred to as seabed sensors and may be any type of geophysical sensor known in the art. In an exemplary implementation, the geophysical sensors may include pressure sensors (e.g., hydrophones) that measure pressure (P) as a scalar and particle-velocity sensors (e.g. geophones and accelerometers) that measure particle velocity (Z) as a vector. The pressure and particle-velocity sensors may be both included in a given seabed sensor. Other examples of geophysical sensors that may be used include pressure-time-gradient responsive seismic sensors, electrodes, magnetometers, temperature sensors, fiber optic sensors, or combinations of the foregoing. In various implementations of the disclosure, geophysical sensors 22 may measure, for example, seismic energy indicative of the response of various structures in the Earth's subsurface formation below the bottom 25 of body of water 15 to energy imparted into the subsurface formation by one or more of signal source 32. Seismic energy, for example, may originate from signal source 32, or an array of such signal sources, deployed in body of water 15 and towed by survey vessel 10.

In some embodiments, geophysical sensors 22 (which may also be referred to as receivers) are configured to store data until they are physically retrieved, at which point the stored data may be accessed. In other embodiments, geophysical sensors 22 may be configured to communicate with survey equipment onshore or in survey vessel wirelessly or using transmission cables, in various embodiments. Geophysical sensors 22 may include relatively stable and/or synchronized clocks to timestamp recorded data. Geophysical sensors 22 may be comprised in ocean bottom cables (OBC) and linked together or may be ocean bottom nodes (OBN) and be individual recording systems (e.g., with a clock, battery, sensor, and data/time recorder integrated within each unit). In the illustrated embodiment, two of geophysical sensors 22 are located distance d1 apart.

Survey equipment 12, in one embodiment, includes a computing system configured to, inter alia, process data from geophysical sensors 22. In other embodiments, a computing system at another location may perform geophysical analysis on data gathered by geophysical survey system 100 (e.g., on land after a survey has been conducted). The computing system may include or be configured to access a non-transitory storage medium having instructions stored thereon that are executable to cause the system to perform various operations described herein. The computing system may include one or more processors configured to execute the program instructions and one or more data storage devices for storing results in a tangible medium.

The pattern of an array of seabed sensors for a survey may be determined in advance in order to generate data usable to perform the disclosed geophysical analysis techniques. The pattern may specify distances between sensors, sensor orientation, shot area, and other parameters.

Figure 2:
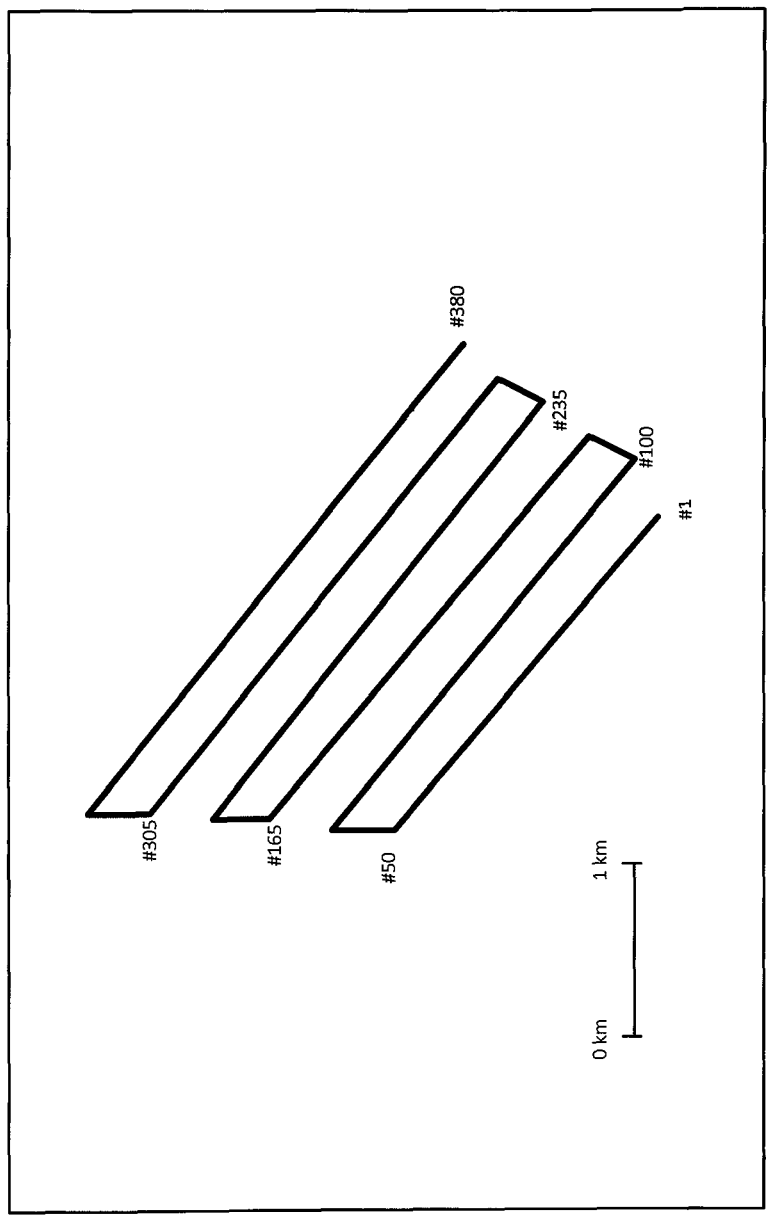
FIG. 2 depicts an exemplary array of seabed sensors in accordance with an embodiment of the invention.

FIG. 2 depicts an exemplary array of seabed sensors in accordance with an embodiment of the invention. As depicted, this exemplary array includes 380 sensors in a "raster-shaped" layout pattern. For purposes of illustration, the numbers depicted indicate the seabed positions of sensors #1, #50, #100, #165, #235, #305 and #380. This layout pattern may be particularly useful in separated wavefield imaging by multiples (SWIM).

Figure 3:
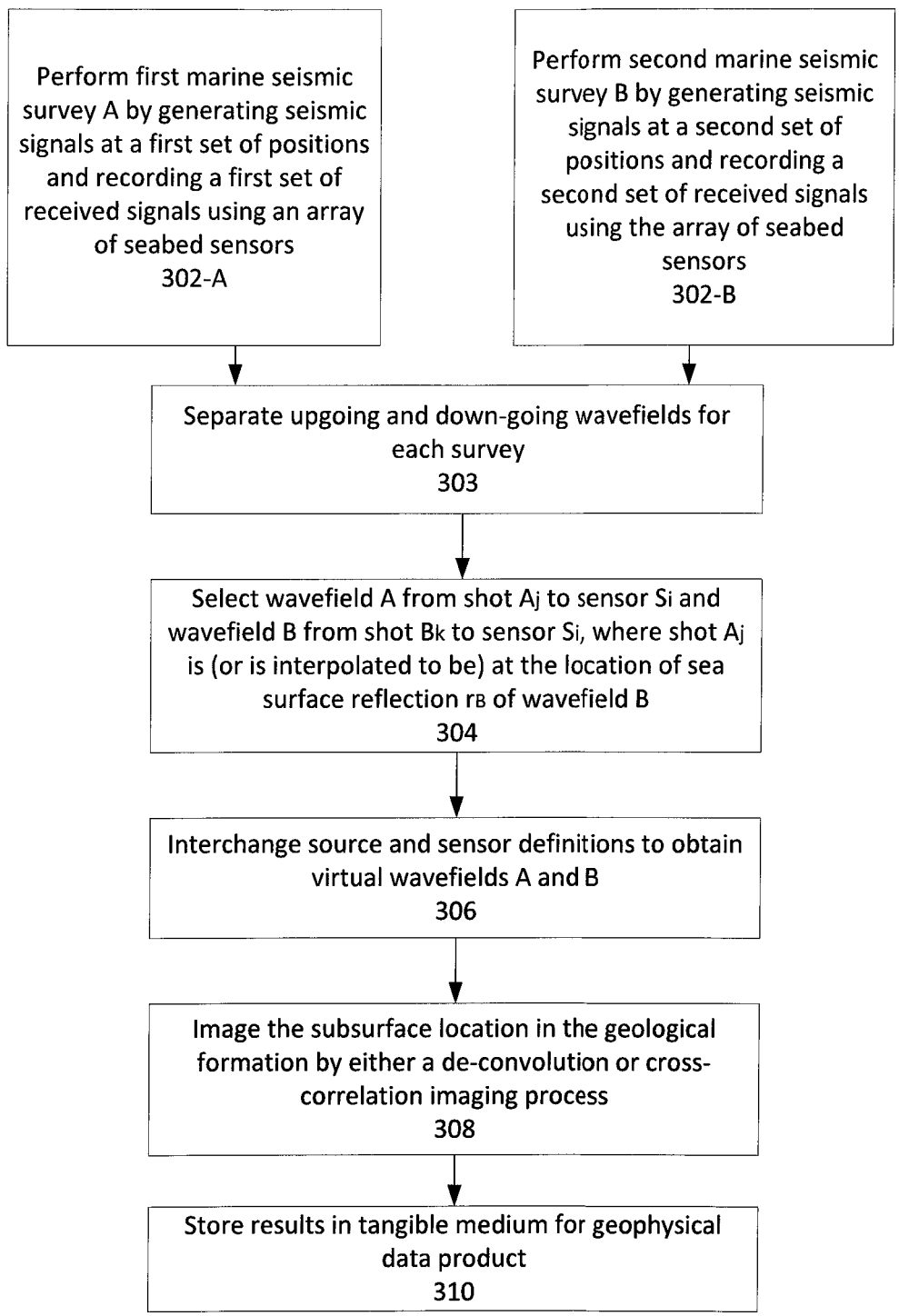
FIG. 3 is a flow chart of a method using seabed sensors and sea surface reflections for structural imaging of a subsurface location in a geological formation in accordance with an embodiment of the invention.

Exemplary Method Combining Data from Multiple Surveys for 3-Dimensional Structural Imaging FIG. 3 is a flow chart of a method 300 using seabed sensors and sea surface reflections for structural imaging of a subsurface location in a geological formation in accordance with an embodiment of the invention. The method 300 combines data from multiple surveys. The steps of FIG. 3 are discussed below in relation to the exemplary case illustrated in FIGS. 4A-4E.

As described below, FIGS. 4A-4E illustrate the method steps of FIG. 3 used to acquire seismic data in multiple surveys (A and B) and process the acquired data in combination to image a subsurface location P in a subsurface region 29. The subsurface region 29 may be difficult or impossible to image using the data from either survey alone due to the geometries of the shot locations relative to the sensor positions. Nevertheless, the subsurface region 29 may be imaged in three-dimensions (3D imaging) using the method described below for multiple subsurface points in the subsurface region 29.

Per step 302-A, a first marine seismic survey (survey A) may be performed. The performance of survey A involves generating seismic signals at a first set of positions and recording a first set of received signals using an array of seabed sensors.

Figure 4A:
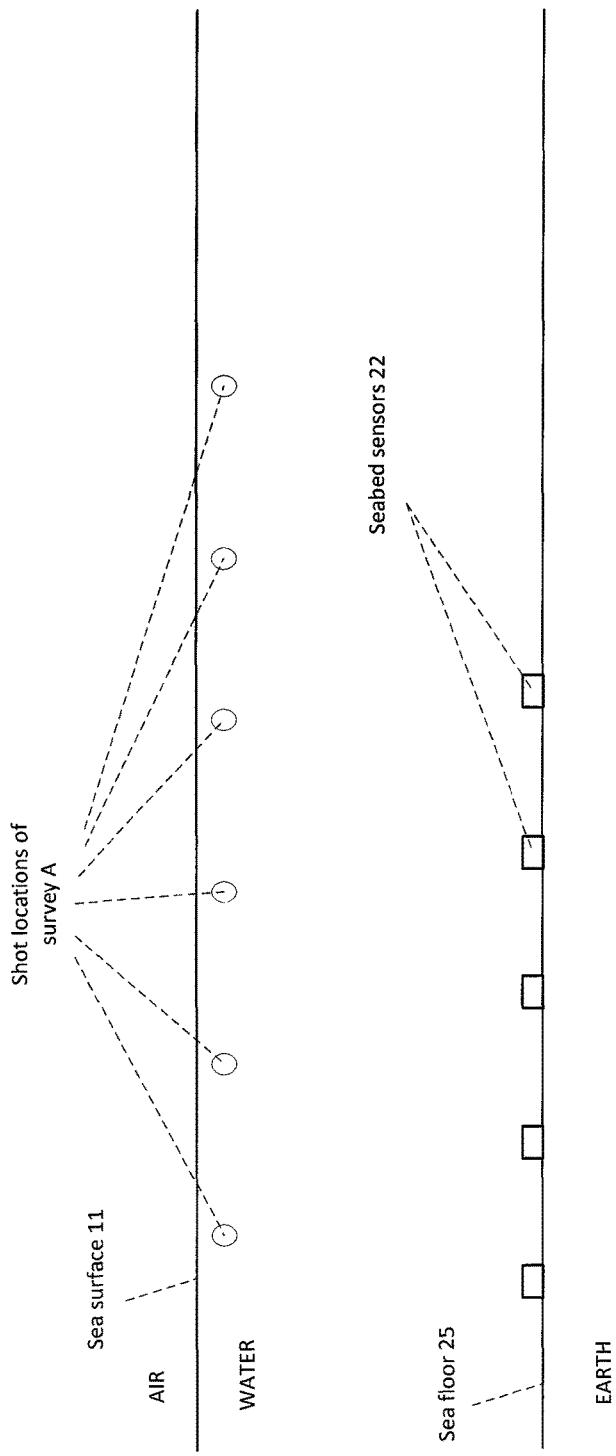
FIG. 4A depicts shot locations of a first seismic survey (A) in accordance with an embodiment of the invention.

An illustrative example of the first survey (survey A) is shown in FIG. 4A. Shown in FIG. 4A are: shot locations of survey A beneath the sea surface 11, and seabed sensors 22 on the sea floor 25.

Per step 302-B, a second marine seismic survey (survey B) may be performed. The performance of survey B involves generating seismic signals at a second set of positions and recording a second set of received signals using the same array (location) of seabed sensors.

Figure 4B:
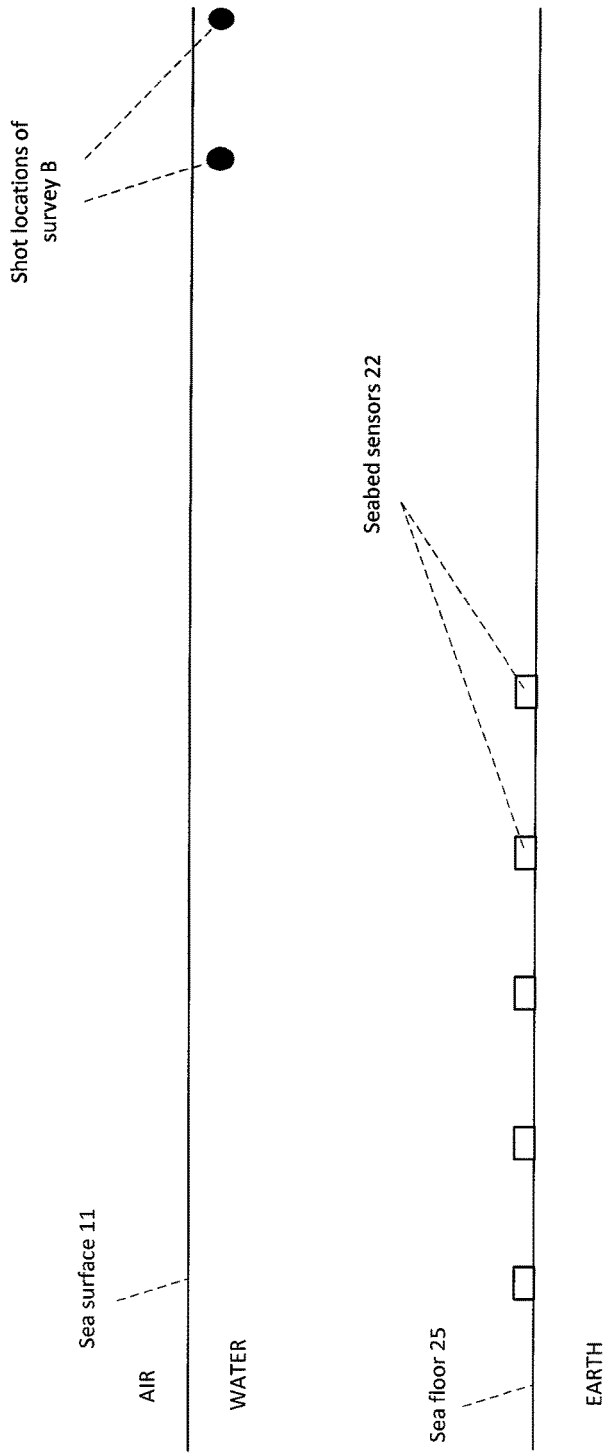
FIG. 4B depicts shot locations of a second seismic survey (B) in accordance with an embodiment of the invention.

An illustrative example of the second survey (survey B) is shown in FIG. 4B. Shown in FIG. 4B are: shot locations of survey B beneath the sea surface 11, and the array of seabed sensors 22 on the sea floor 25. Note that, in accordance with the illustrated embodiment, the locations of the seabed sensors location 22 do not change between surveys A and B.

Per step 303, up-going and down-going wavefields are separated for each survey. In an exemplary implementation, this may be accomplished by computing the summation and difference between the pressure (P) and particle velocity (Z) fields. Because the up-going wavefield is in-phase for both pressure and particle-velocity records, the up-going wavefield may be extracted by summing the two measurements (PZ-summation) after calibration. The down-going wavefield is canceled in the PZ-summation because it is out-of-phase on the P field compared to the Z field. The down-going wavefield may be extracted by determining the difference between the P field and the calibrated Z field.

Per step 304, wavefield A from survey A and wavefield B from survey B are selected. Each selected wavefield originates at a shot location and ends at a sensor.

Figure 4C:
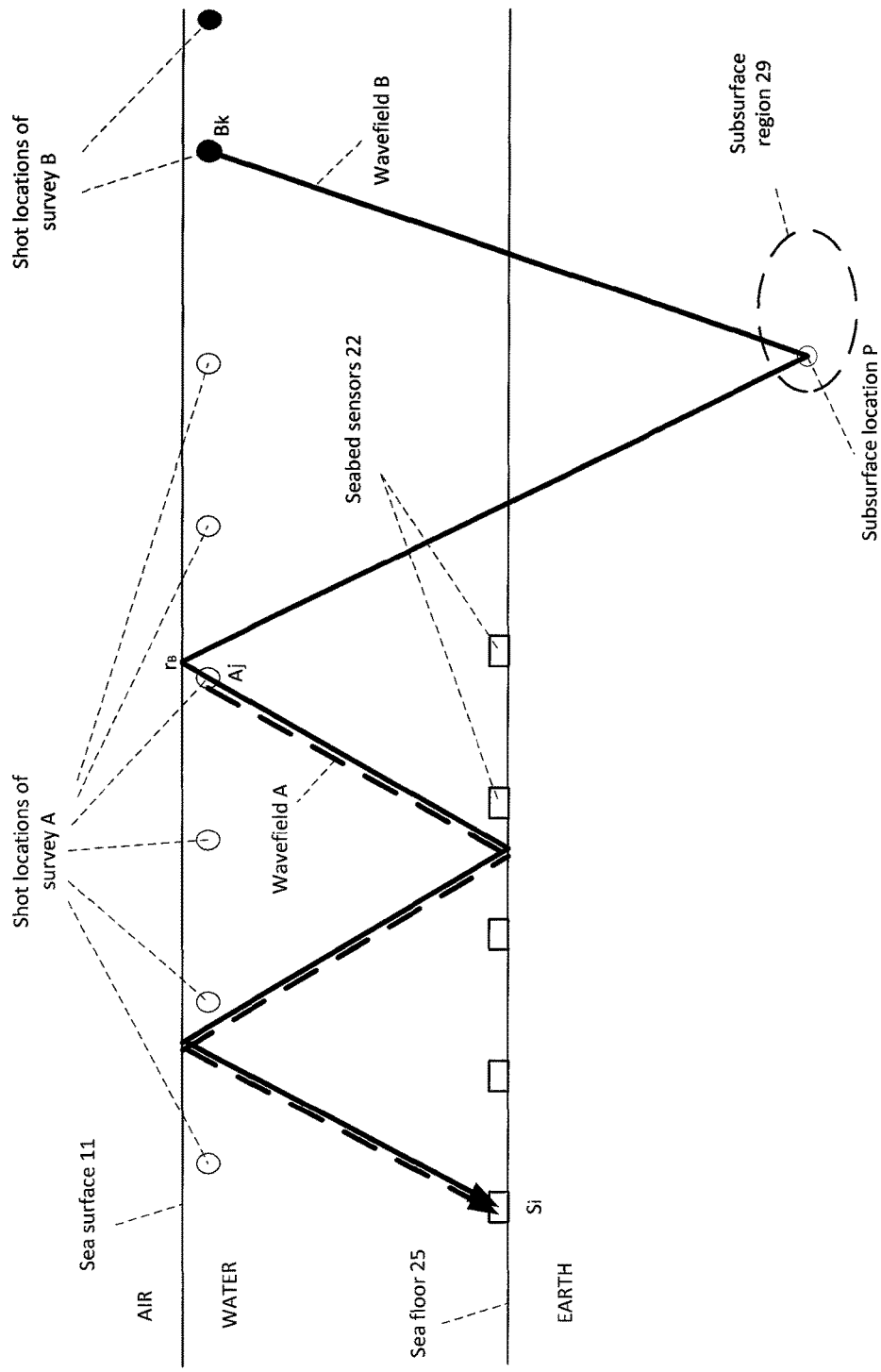
FIG. 4C depicts wavefields from the first and second seismic surveys (A and B) that are utilized in combination to image a subsurface location (P) in accordance with an embodiment of the invention.

As illustrated in FIG. 4C, the selected wavefield B originates at shot location $B_k$ from survey B and travels downward. Wavefield B reflects from subsurface point P in the subsurface region 29 so as to travel upward, then reflects from point $r_B$ of the sea surface 11 so as to travel downward. Wavefield B may then reflect from the sea floor 25 so as to travel upward, then reflect from the sea surface 11 again to travel downward until it is detected by a seabed sensor at seabed position $S_i$.

As further illustrated in FIG. 4C, the selected wavefield A originates at shot location $A_j$ and travels downward. Wavefield A may reflect from the sea floor 25 so as to travel upward, then reflect from the sea surface 11 to travel downward until it is detected by the seabed sensor at the same seabed position $S_i$ as that which detected wavefield B. Note that the first sea-surface reflection point $r_B$ of wavefield B may be located at shot location $A_j$ from survey A. Alternatively, a wavefield interpolation process may be performed to obtain a correspondence between the first sea-surface reflection point $r_B$ of wavefield B and the shot location $A_j$ from survey A.

Per step 306, the source and sensor definitions of wavefield A may be interchanged to obtain virtual wavefield A, and source and sensor definitions of wavefield B may be interchanged to obtain virtual wavefield B. The resultant virtual wavefields A and B are illustrated in FIG. 4D.

As depicted in FIG. 4D, virtual wavefield A originates at virtual source location 402 at location Si, travels upward to be reflected downward by the sea surface 11, travels downward until reflected upward by the sea floor 25, and travels upward to be detected by the first (intermediate) virtual sensor 404 at location $A_j$. As further depicted, virtual wavefield B originates at virtual source location 402 at location Si, travels upward to be reflected downward by the sea surface 11, travels downward until reflected upward by the sea floor 25, travels upward to be reflected downward at reflection location $r_B$, travels downward to be reflected upward at subsurface location P, and travels upward to be detected by the second (final) virtual sensor 406 at location $B_k$.

Per step 308, the subsurface location in the geological formation of interest may be imaged, either using a deconvolution or cross-correlation imaging process. In one embodiment, the geophysical analysis equipment may be configured to deconvolve virtual wavefield B using virtual wavefield A to obtain deconvolved virtual wavefield B/A. The deconvolved virtual wavefield B/A may be effectively used as the imaging wavefield signal 410.

Figure 4E:
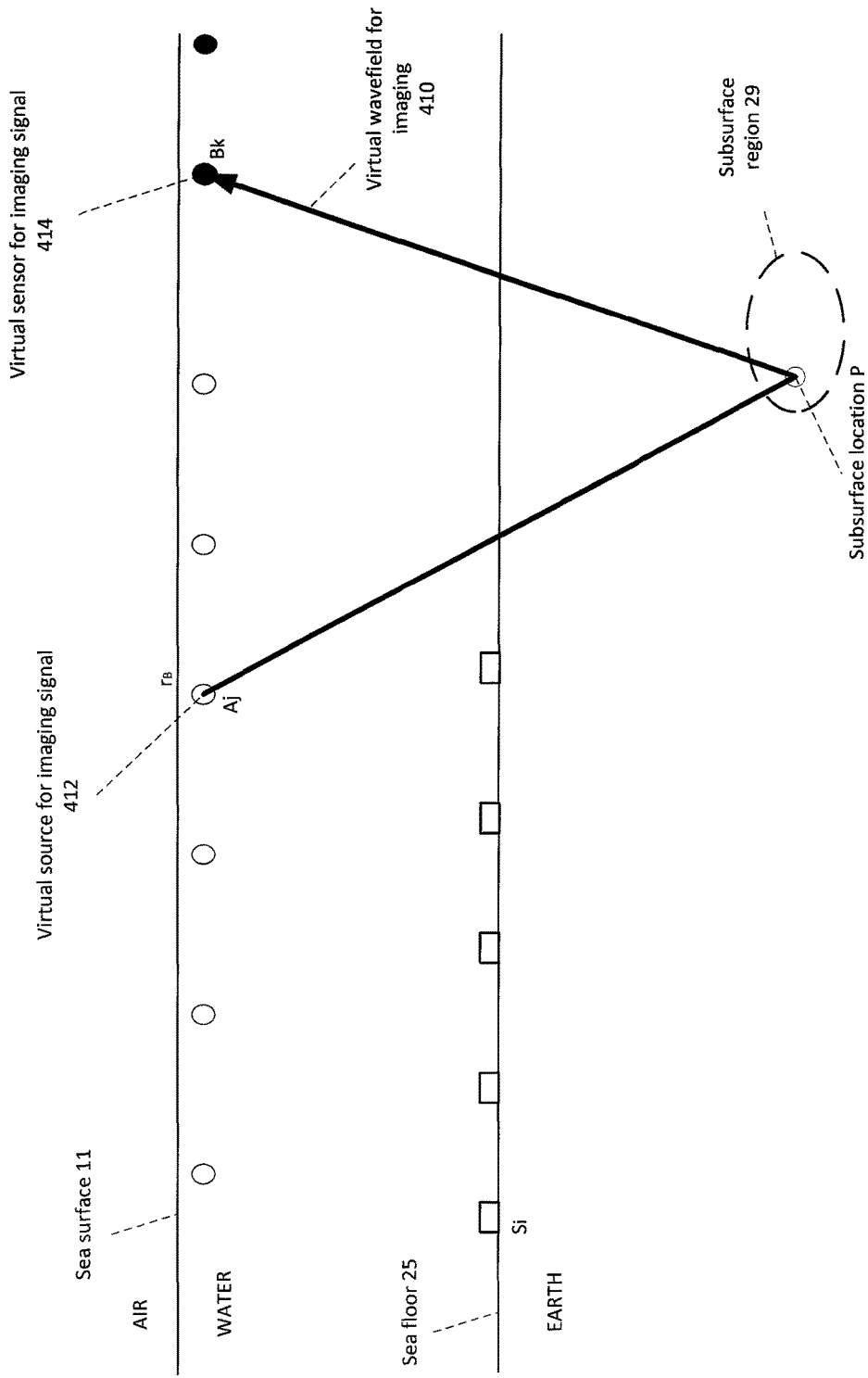
FIG. 4E depicts the virtual wavefield utilized for imaging the subsurface location (P) after deconvolution or cross-correlation is applied to the virtual wavefields of FIG. 4D in accordance with an embodiment of the invention.

As depicted in FIG. 4E, the imaging wavefield signal 410 may be considered as originating at a virtual source 412 at location $A_j$ (which is effectively the same as, or made to correspond with, $r_B$), traveling downward to be reflected upward at the subsurface location P, and traveling upward to be detected by the virtual sensor 414 at location $B_k$.

In an alternate embodiment, the geophysical analysis equipment may be configured to perform cross-correlation in order to image subsurface location P. In this embodiment, a first data signal may be the data signal received at the first (intermediate) virtual sensor 404 at location $A_j$, and a second data signal may be the data signal received at the second (final) virtual sensor 406 at location $B_k$. The cross-correlation of the first data signal and the second data signal may provide the medium response (i.e., the Green's function) of the subsurface location P. The result is similar to imaging using a virtual source-receiver pair, where the virtual source 412 and virtual receiver 414 (shown in FIG. 4E) are located at the positions of the virtual sensors 404 and 406, respectively (shown in FIG. 4D).

Per step 310, the resultant image data and other pertinent data is stored in a tangible, non-volatile data storage medium. Tangible medium holding such image and other pertinent data may subsequently be provided as a geophysical data product.

Missing Shots Due to Obstruction

As described above, the series of FIGS. 4A-4E illustrates a first exemplary application of the method 300 where a subsurface region 29 may be difficult or impossible to image using the data from either survey alone. Similarly, the series of FIGS. 5A-5E illustrates a second exemplary application of the method 300 where an obstruction at the sea surface blocks shot locations such that one survey has missing shots.

Figure 5A:
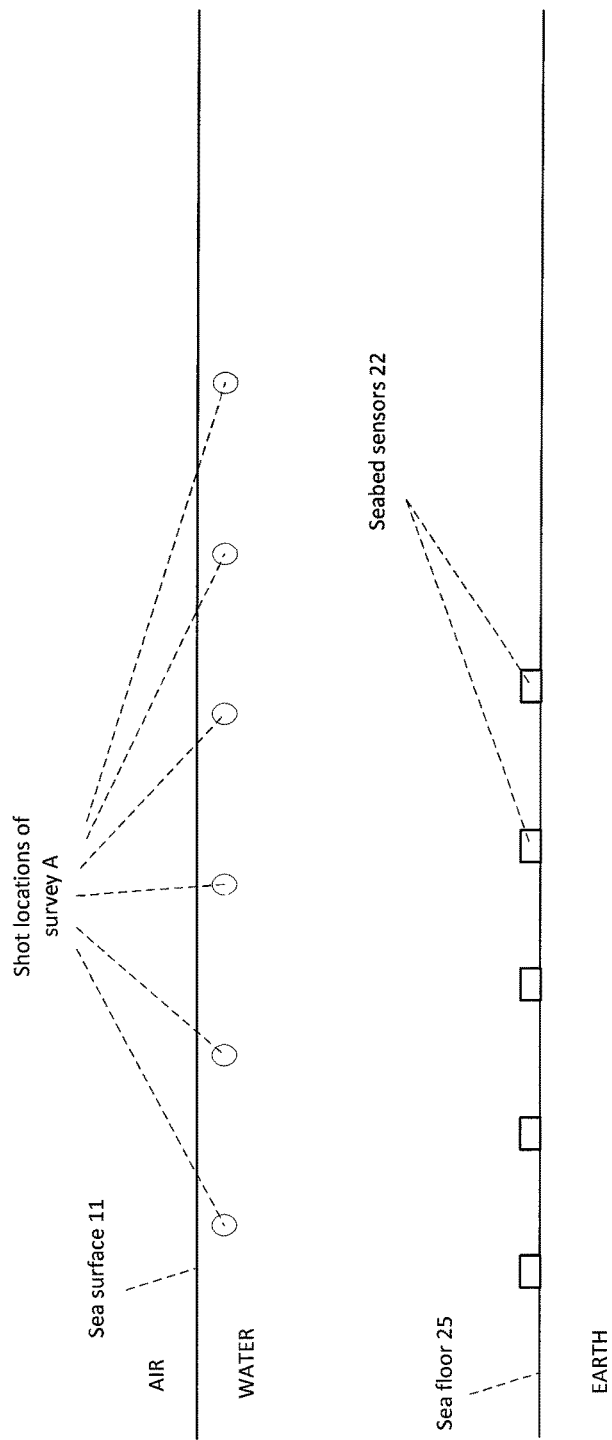
FIG. 5A depicts shot locations of a first seismic survey (A) in accordance with an embodiment of the invention.

Like FIG. 4A, FIG. 5A depicts an illustrative example of a first seismic survey (A) in accordance with an embodiment of the invention. Shown in FIG. 5A are: shot locations of survey A beneath the sea surface 11, and seabed sensors 22 on the sea floor 25.

Figure 5B:
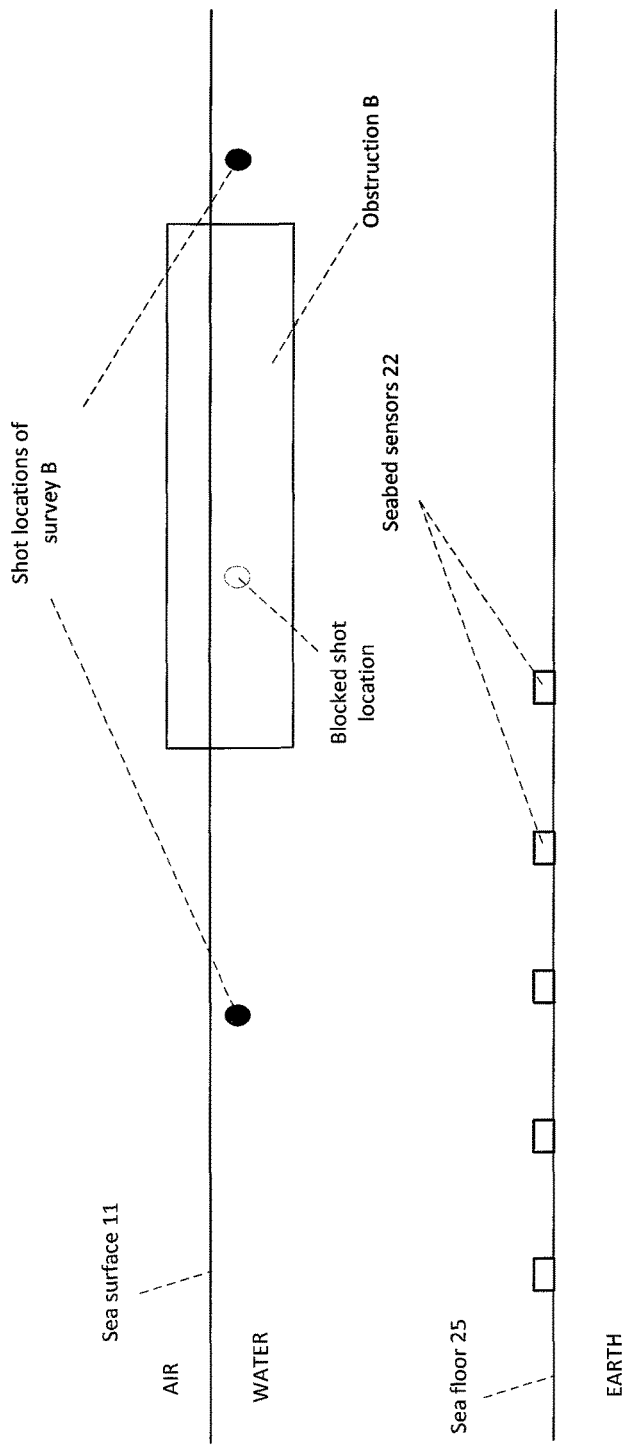
FIG. 5B depicts shot locations of a second seismic survey (B) in the presence of a surface obstruction in accordance with an embodiment of the invention.

FIG. 5B depicts a second seismic survey (B) in the presence of a surface obstruction B in accordance with an embodiment of the invention. The surface obstruction B may be, for example, an offshore production platform, an offshore drilling platform, or a drillship. As depicted, the surface obstruction B blocks one or more shot locations that were planned to be taken during survey B.

Figure 5C:
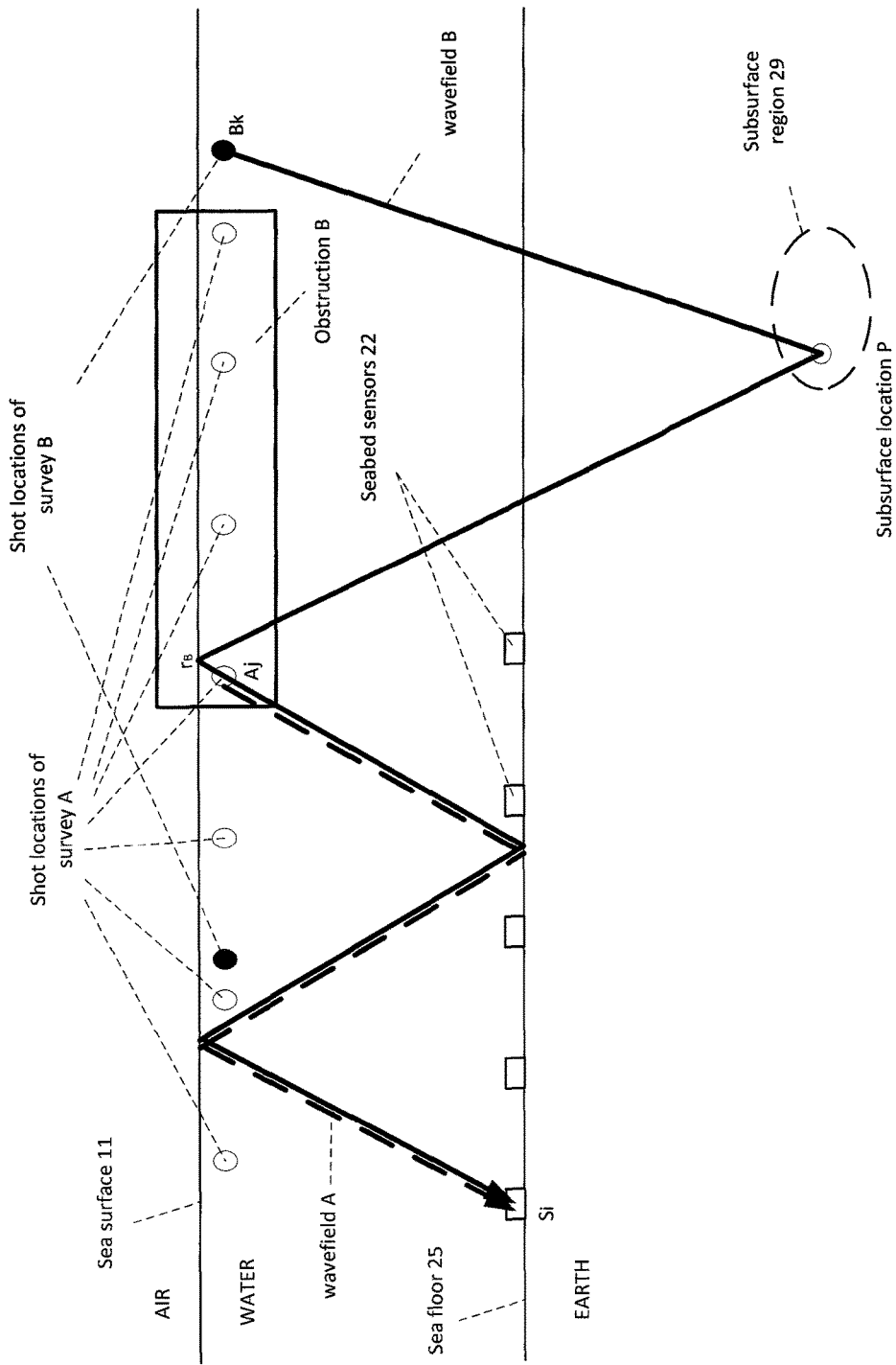
FIG. 5C depicts wavefields from the first and second seismic surveys (A and B) that are utilized in combination to image a subsurface location (P) that may be underneath the obstruction in accordance with an embodiment of the invention.

FIG. 5C depicts wavefields from the first and second seismic surveys (A and B) that are utilized in combination to image a subsurface location (P) that may be underneath the obstruction in accordance with an embodiment of the invention. FIG. 5C in the series of FIGS. 5A-5E corresponds to FIG. 4C in the series of FIGS. 4A-4E.

As illustrated in FIG. 5C, the selected wavefield B originates at shot location $B_k$ from survey B and travels downward. Wavefield B reflects from subsurface point P in the subsurface region 29 so as to travel upward, then reflects from point $r_B$ of the sea surface 11 so as to travel downward. Wavefield B may then reflect from the sea floor 25 so as to travel upward, then reflect from the sea surface 11 again to travel downward until it is detected by a seabed sensor at the seabed position $S_i$.

As further illustrated in FIG. 5C, the selected wavefield A originates at shot location $A_j$ and travels downward. Wavefield A may reflect from the sea floor 25 so as to travel upward, then reflect from the sea surface 11 to travel downward until it is detected by the seabed sensor at the same seabed position $S_i$ as that which detected wavefield B. Note that the first sea-surface reflection point $r_B$ of wavefield B may be located at shot location $A_j$ from survey A. Alternatively, a wavefield interpolation process may be performed to obtain a correspondence between the first sea-surface reflection point $r_B$ of wavefield B and the shot location $A_j$ from survey A.

Figure 5D:
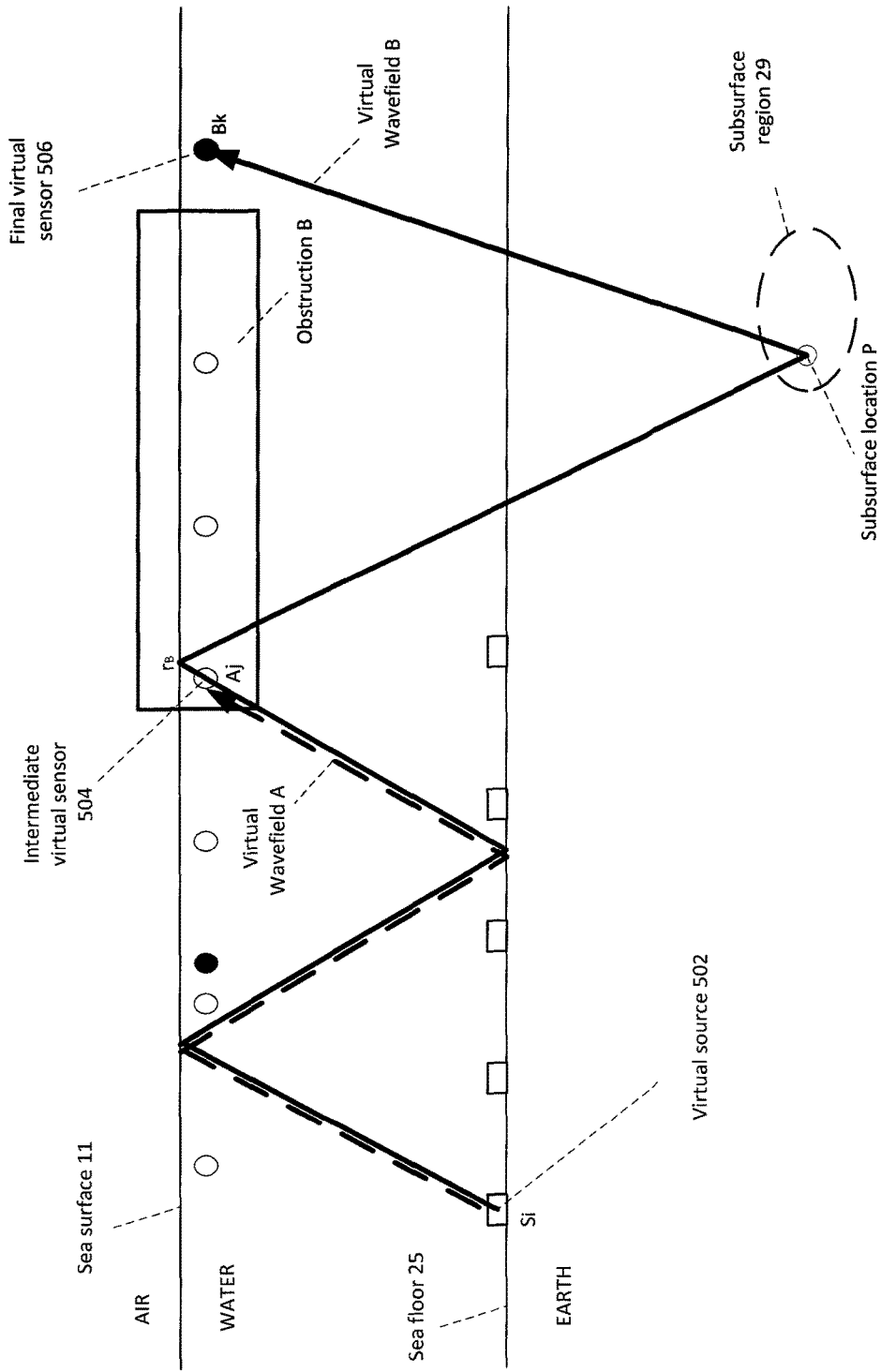
FIG. 5D depicts virtual wavefields after reversal of source and sensor definitions of FIG. 5C in accordance with an embodiment of the invention.

FIG. 5D depicts virtual wavefields after reversal of source and sensor definitions of FIG. 5C in accordance with an embodiment of the invention. FIG. 5D in the series of FIGS. 5A-5E corresponds to FIG. 4D in the series of FIGS. 4A-4E.

As depicted in FIG. 5D, virtual wavefield A originates at virtual source location 502 at location Si, travels upward to be reflected downward by the sea surface 11, travels downward until reflected upward by the sea floor 25, and travels upward to be detected by the first (intermediate) virtual sensor 504 at location $A_j$. As further depicted, virtual wavefield B originates at virtual source location 502 at location Si, travels upward to be reflected downward by the sea surface 11, travels downward until reflected upward by the sea surface 25, travels upward to be reflected downward at reflection location $r_B$, travels downward to be reflected upward at subsurface location P, and travels upward to be detected by the second (final) virtual sensor 506 at location $B_k$.

Figure 5E:
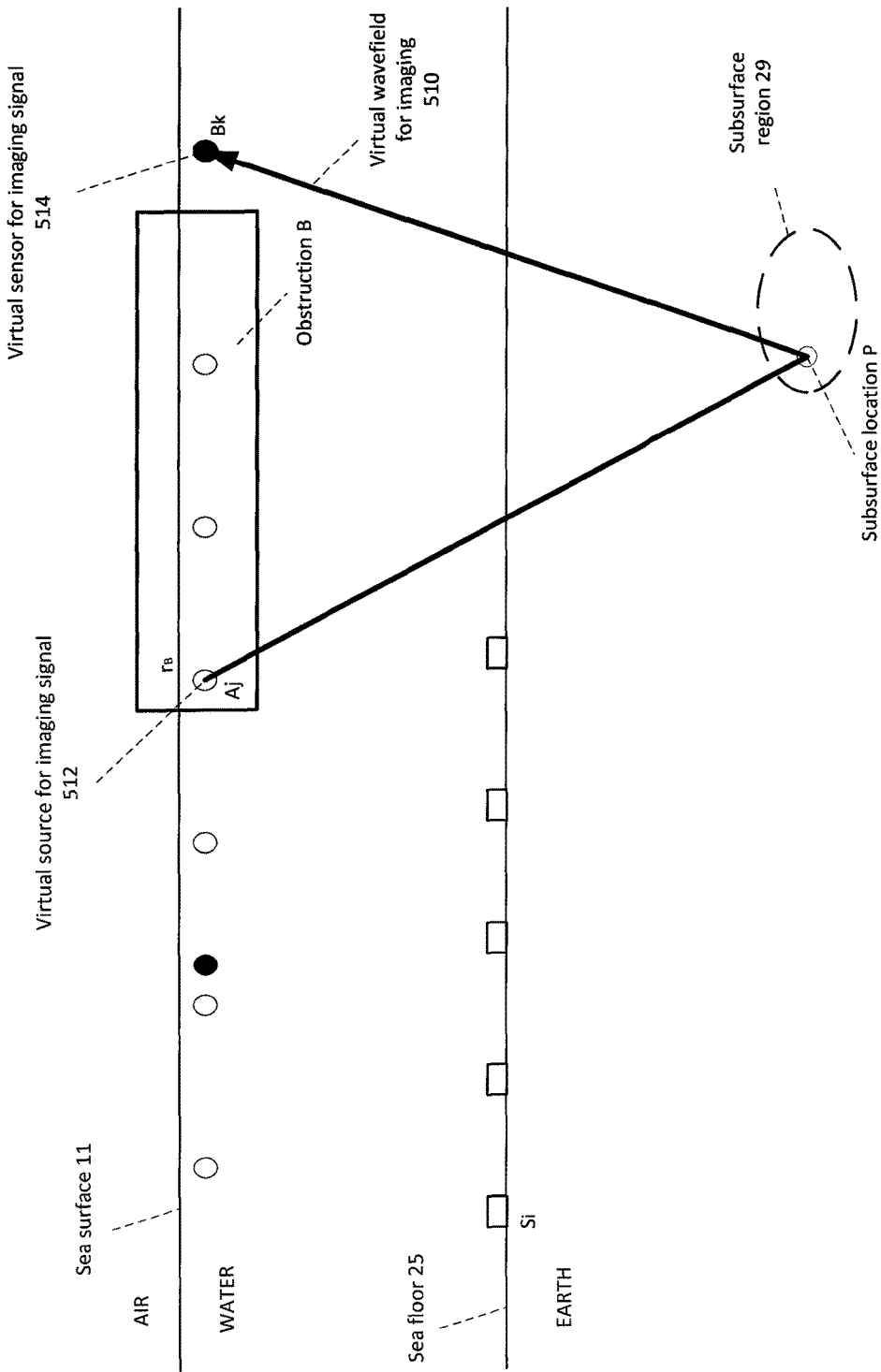
FIG. 5E depicts the virtual wavefield utilized for imaging the subsurface location (P) after deconvolution or cross-correlation is applied to the virtual wavefields of FIG. 5D in accordance with an embodiment of the invention.

FIG. 5E depicts the virtual wavefield utilized for imaging the subsurface location (P) after deconvolution or cross-correlation is applied to the virtual wavefields of FIG. 5D in accordance with an embodiment of the invention. FIG. 5E in the series of FIGS. 5A-5E corresponds to FIG. 4E in the series of FIGS. 4A-4E.

As depicted in FIG. 5E, the imaging wavefield signal 510 may be considered as originating at a virtual source 512 at location $A_j$ (which is effectively the same as, or made to correspond with, $r_B$), traveling downward to be reflected upward at the subsurface location P, and traveling upward to be detected by the virtual sensor 514 at location $B_k$. The result is that subsurface location P in the subsurface region 29 may be imaged, despite the missing shot(s) due to the obstruction at the sea surface during survey B.

Combining Data from Surveys with Different Shot Intervals

Also similar to the series of FIGS. 4A-4E, the series of FIGS. 6A-6E illustrates a third exemplary case where two surveys have different shot intervals from each other. Despite the different spacings between the shots, select data signals may be processed in combination as described below.

Figure 6A:
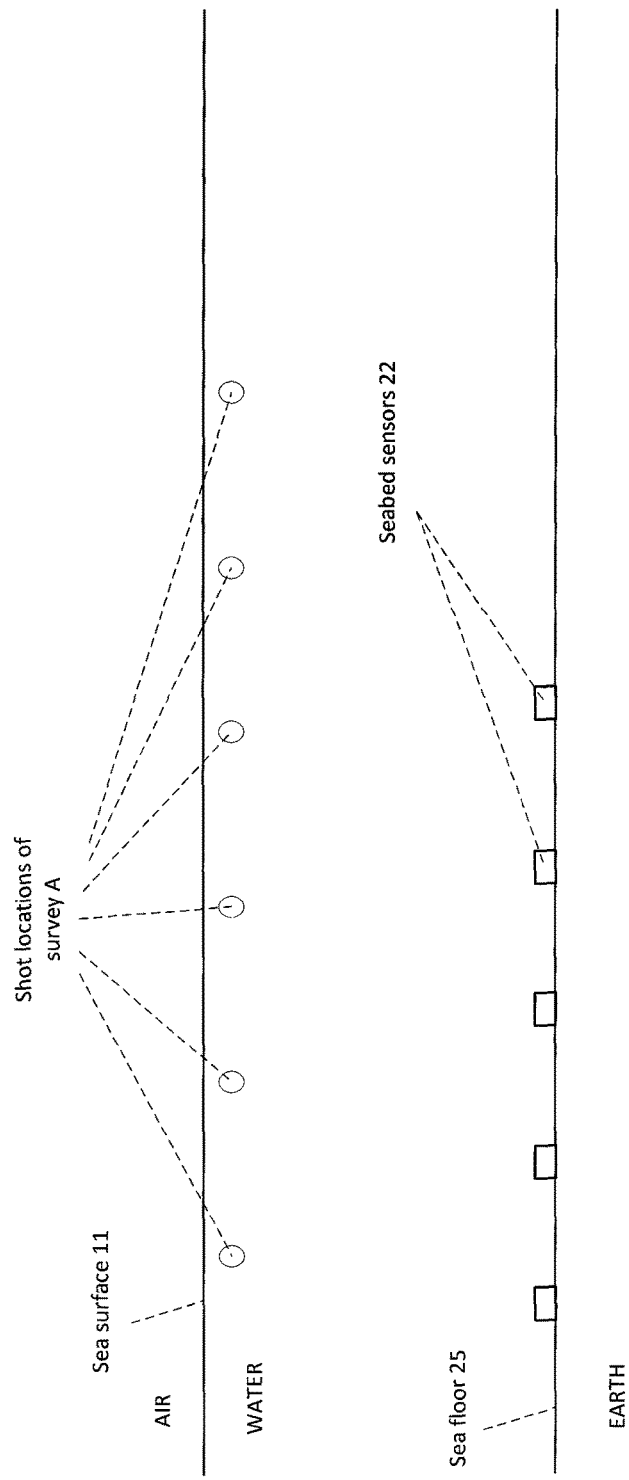
FIG. 6A depicts shot locations of a first seismic survey (A) in accordance with an embodiment of the invention.

Like FIG. 4A, FIG. 6A depicts a first seismic survey (A) in accordance with an embodiment of the invention. Shown in FIG. 6A are: shot locations of survey A beneath the sea surface 11, and seabed sensors 22 on the sea floor 25.

Figure 6B:
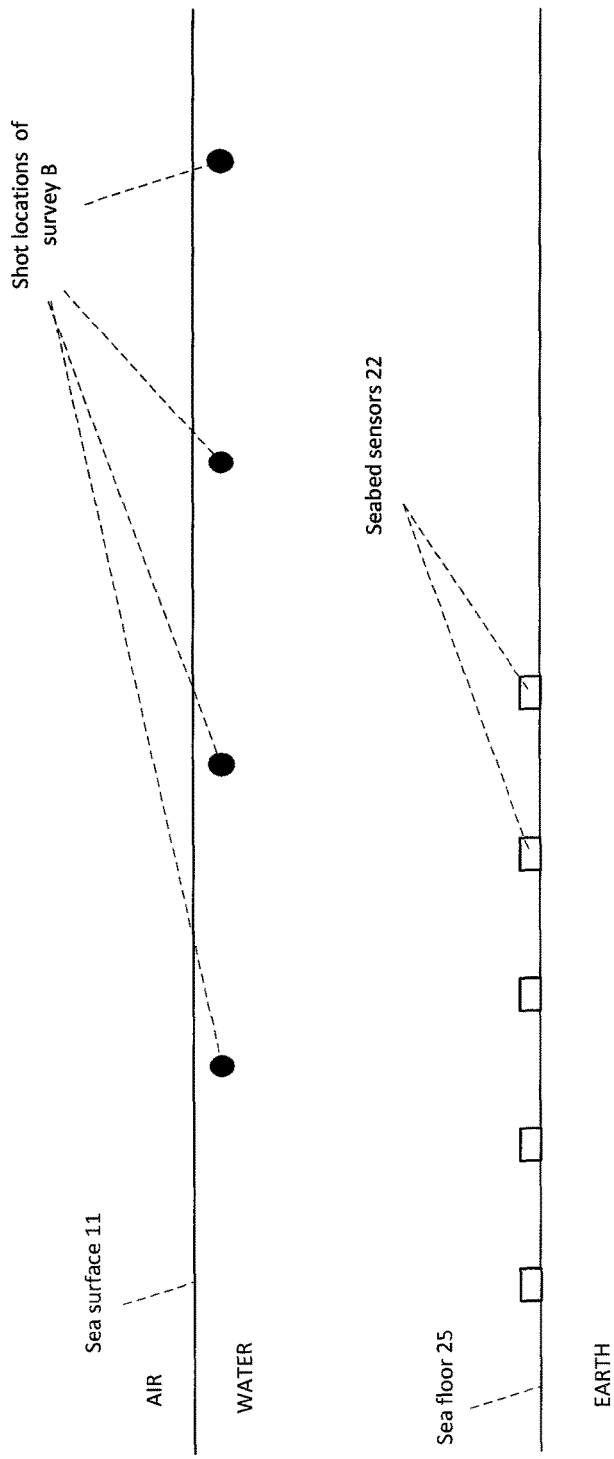
FIG. 6B depicts shot locations of a second seismic survey (B) with different shot intervals than the first seismic survey (A) in accordance with an embodiment of the invention.

FIG. 6B depicts a second seismic survey (B) with different shot intervals than the first seismic survey (A) in accordance with an embodiment of the invention. In the illustrated example, the shots in survey B are spaced farther apart than the shots in survey A.

Figure 6C:
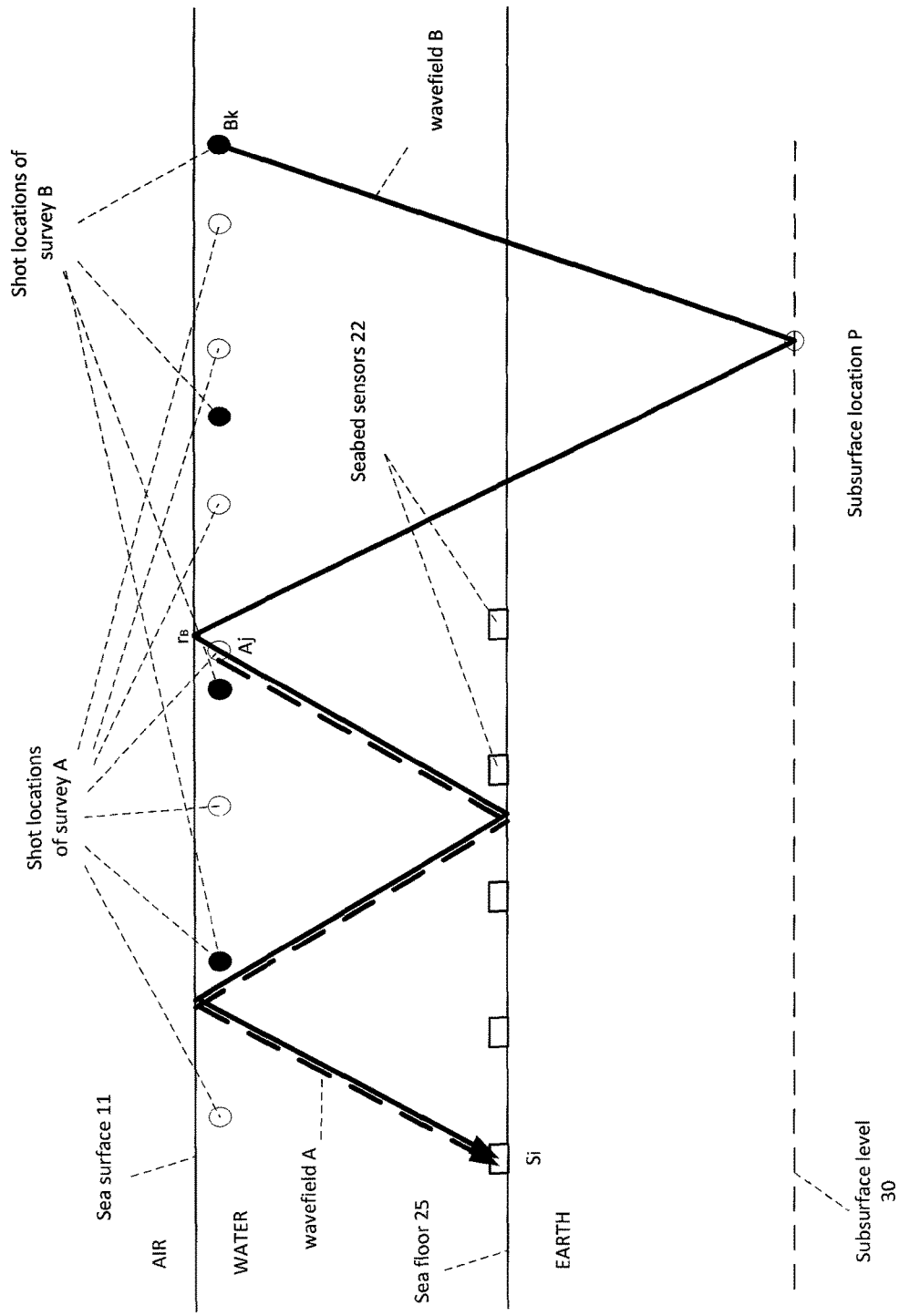
FIG. 6C depicts wavefields from the first and second seismic surveys (A and B) that are utilized in combination to image a subsurface location (P) in accordance with an embodiment of the invention.

FIG. 6C depicts wavefields from the first and second seismic surveys (A and B) that are utilized in combination to image a subsurface location (P) in accordance with an embodiment of the invention. FIG. 6C in the series of FIGS. 6A-6E corresponds to FIG. 4C in the series of FIGS. 4A-4E.

As illustrated in FIG. 6C, the selected wavefield B originates at shot location $B_k$ from survey B and travels downward. Wavefield B reflects from subsurface point P at a subsurface level 30 so as to travel upward, then reflects from point $r_B$ of the sea surface 11 so as to travel downward. Wavefield B may then reflect from the sea floor 25 so as to travel upward, then reflect from the sea surface 11 again to travel downward until it is detected by a seabed sensor at the seabed position $S_i$.

As further illustrated in FIG. 6C, the selected wavefield A originates at shot location $A_j$ and travels downward. Wavefield A may reflect from the sea floor 25 so as to travel upward, then reflect from the sea surface 11 to travel downward until it is detected by the seabed sensor at the same seabed position $S_i$ as that which detected wavefield B. Note that the first sea-surface reflection point $r_B$ of wavefield B may be located at shot location $A_j$ from survey A. Alternatively, a wavefield interpolation process may be performed to obtain a correspondence between the first sea-surface reflection point $r_B$ of wavefield B and the shot location $A_j$ from survey A.

Figure 6D:
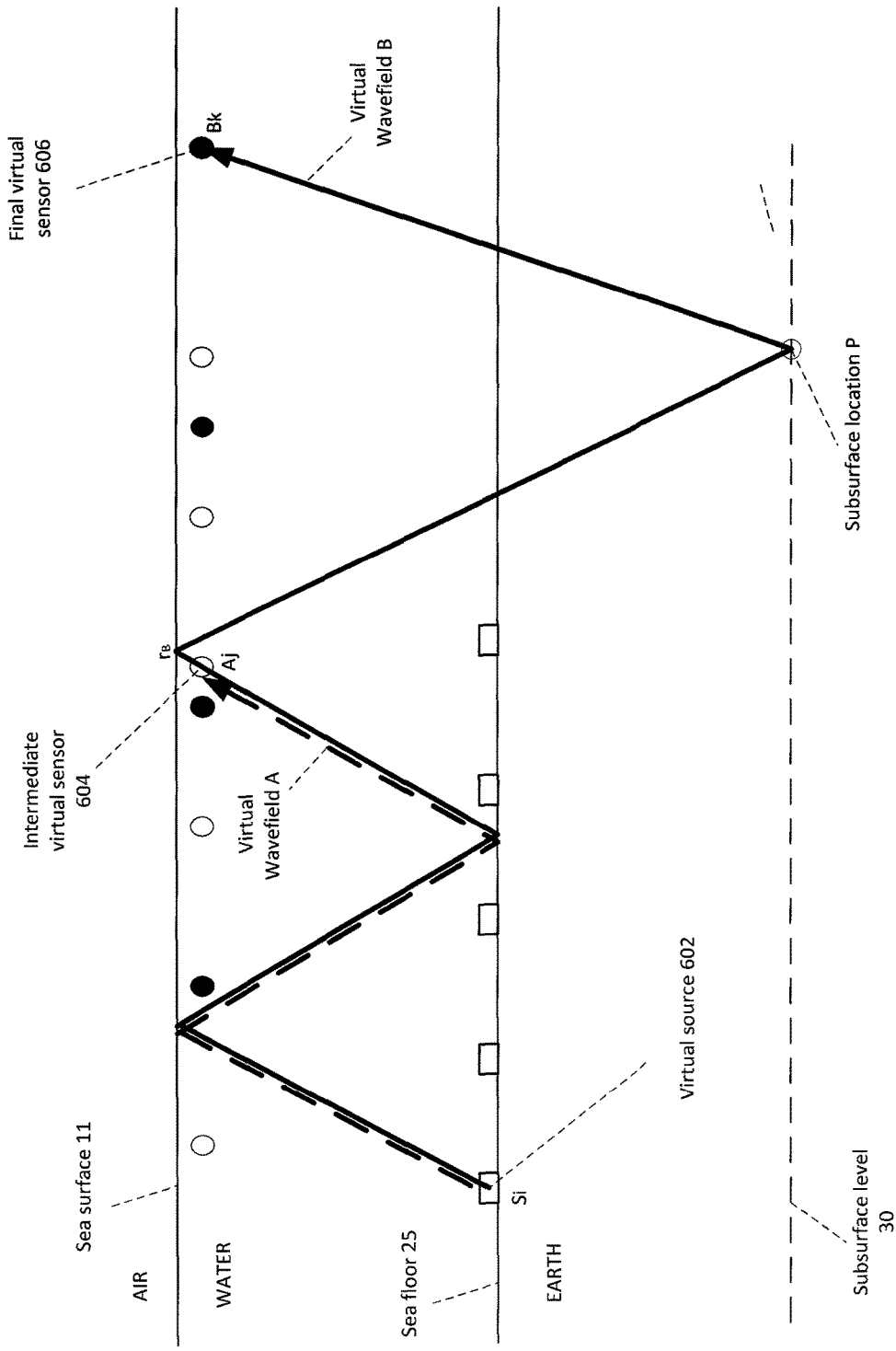
FIG. 6D depicts virtual wavefields after reversal of source and sensor definitions of FIG. 6C in accordance with an embodiment of the invention.

FIG. 6D depicts virtual wavefields after reversal of source and sensor definitions of FIG. 6C in accordance with an embodiment of the invention. FIG. 6D in the series of FIGS. 6A-6E corresponds to FIG. 4D in the series of FIGS. 4A-4E.

As depicted in FIG. 6D, virtual wavefield A originates at virtual source location 602 at location Si, travels upward to be reflected downward by the sea surface 11, travels downward until reflected upward by the sea floor 25, and travels upward to be detected by the first (intermediate) virtual sensor 604 at location $A_j$. As further depicted, virtual wavefield B originates at virtual source location 602 at location Si, travels upward to be reflected downward by the sea surface 11, travels downward until reflected upward by the sea floor 25, travels upward to be reflected downward at reflection location $r_B$, travels downward to be reflected upward at subsurface location P, and travels upward to be detected by the second (final) virtual sensor 606 at location $B_k$.

Figure 6E:
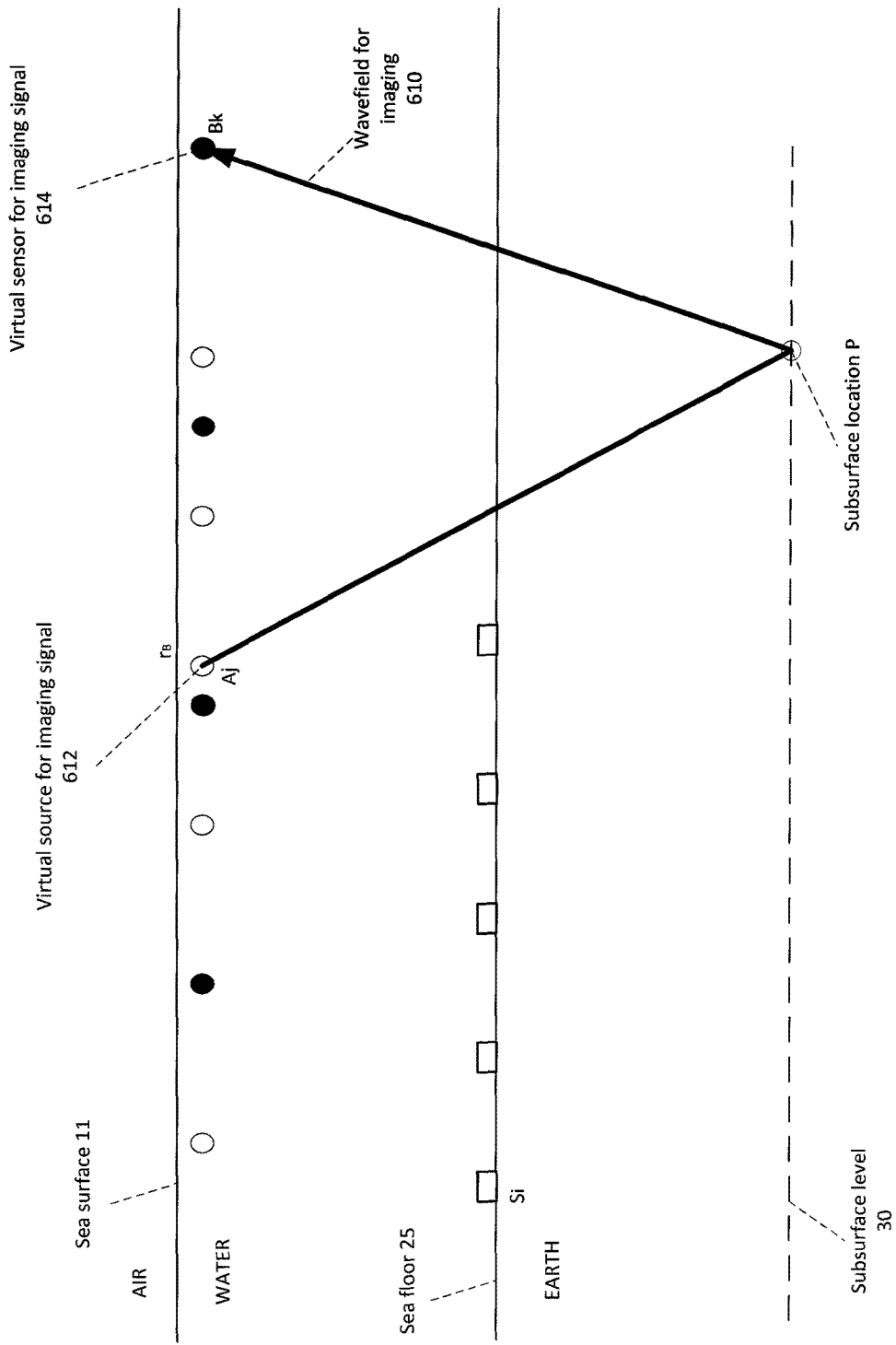
FIG. 6E depicts the virtual wavefield utilized for imaging the subsurface location (P) after deconvolution or cross-correlation is applied to the virtual wavefields of FIG. 6D in accordance with an embodiment of the invention.

FIG. 6E depicts the virtual wavefield utilized for imaging the subsurface location (P) after deconvolution or cross-correlation is applied to the virtual wavefields of FIG. 6D in accordance with an embodiment of the invention. FIG. 6E in the series of FIGS. 6A-6E corresponds to FIG. 4E in the series of FIGS. 4A-4E.

As depicted in FIG. 6E, the imaging wavefield signal 610 may be considered as originating at a virtual source 612 at location $A_j$ (which is effectively the same as, or made to correspond with, $r_B$), traveling downward to be reflected upward at the subsurface location P, and traveling upward to be detected by the virtual sensor 614 at location $B_k$. The result is that subsurface location P at subsurface level 30 may be imaged using a combination of data from surveys A and B.

Figure 7:
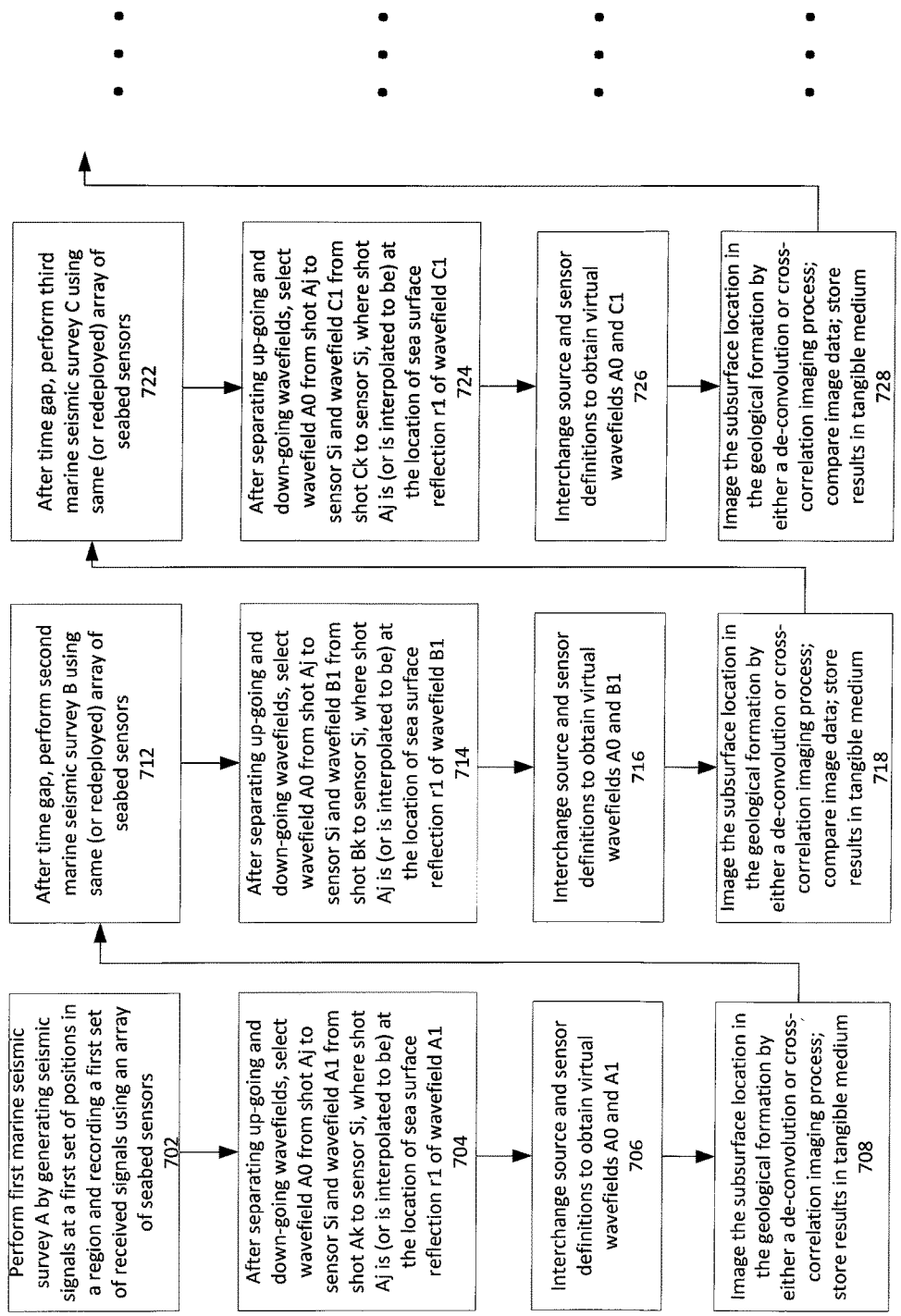
FIG. 7 is a flow chart of a method using seabed sensors and sea surface reflections for reservoir production monitoring in accordance with an embodiment of the invention.

Exemplary Method Combining Data from Multiple Surveys for 4-Dimensional Surveying FIG. 7 is a flow chart of a method 700 using seabed sensors and sea surface reflections for four-dimensional (4D) surveying for reservoir production monitoring in accordance with an embodiment of the invention. The steps 702-728 of FIG. 7 are discussed below in relation to the exemplary case illustrated in FIGS. 8A-8I.

Figure 8A:
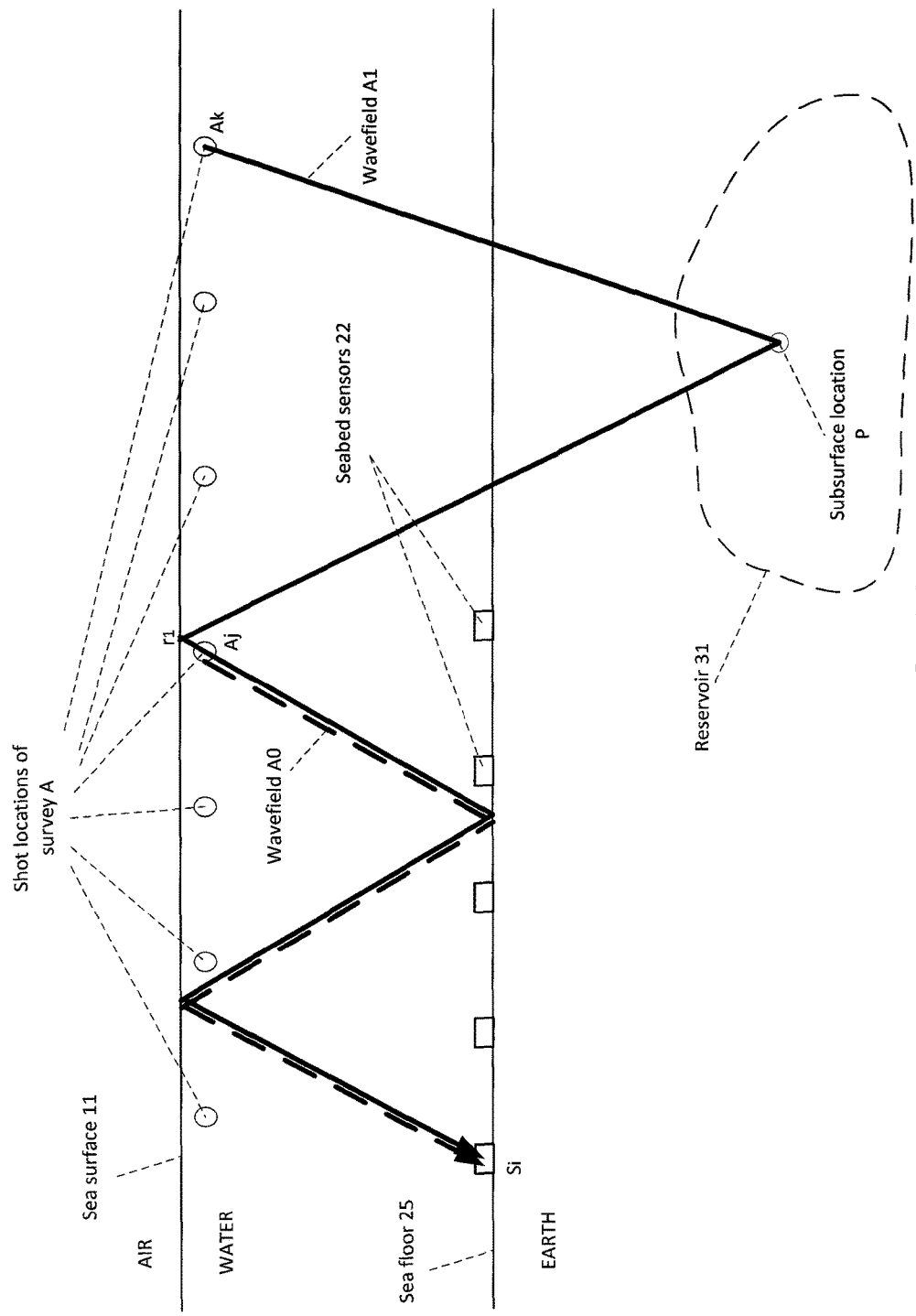
FIG. 8A depicts wavefields (A0 and A1) from a first seismic survey (A) at a first time that may be utilized in combination to image a subsurface location (P) at the first time in accordance with an embodiment of the invention.

Per step 702, a first marine seismic survey (survey A) may be performed. The performance of survey A involves generating seismic signals at a first set of positions and recording a first set of received signals using an array of seabed sensors. An illustrative example of the first survey (survey A) is shown in FIG. 8A. Shown in FIG. 8A are: shot locations of survey A beneath the sea surface 11, and seabed sensors 22 on the sea floor 25.

Per step 704, after separating up-going and down-going wavefields, wavefields A0 and A1 from survey A are selected. As depicted in FIG. 8A, the two wavefields A0 and A1 originate at different shot locations and end at the same sensor. The selected wavefield A1 originates at shot location $A_k$ from survey A and travels downward. Wavefield A1 reflects from subsurface point P in the reservoir 31 so as to travel upward, then reflects from point $r_1$ of the sea surface 11 so as to travel downward. Wavefield A1 may then reflect from the sea floor 25 so as to travel upward, then reflect from the sea surface 11 again to travel downward until it is detected by a seabed sensor at the seabed position $S_i$. The selected wavefield A0 originates at shot location $A_j$ and travels downward. Wavefield A0 may reflect from the sea floor 25 so as to travel upward, then reflect from the sea surface 11 to travel downward until it is detected by the seabed sensor at the same seabed position $S_i$ as that which detected wavefield A1. Note that the first sea-surface reflection point $r_1$ of wavefield A1 may be located at shot location $A_j$ from survey A0. Alternatively, a wavefield interpolation process may be performed to obtain a correspondence between the first sea-surface reflection point $r_1$ of wavefield A1 and the shot location $A_j$ from survey A0.

Figure 8B:
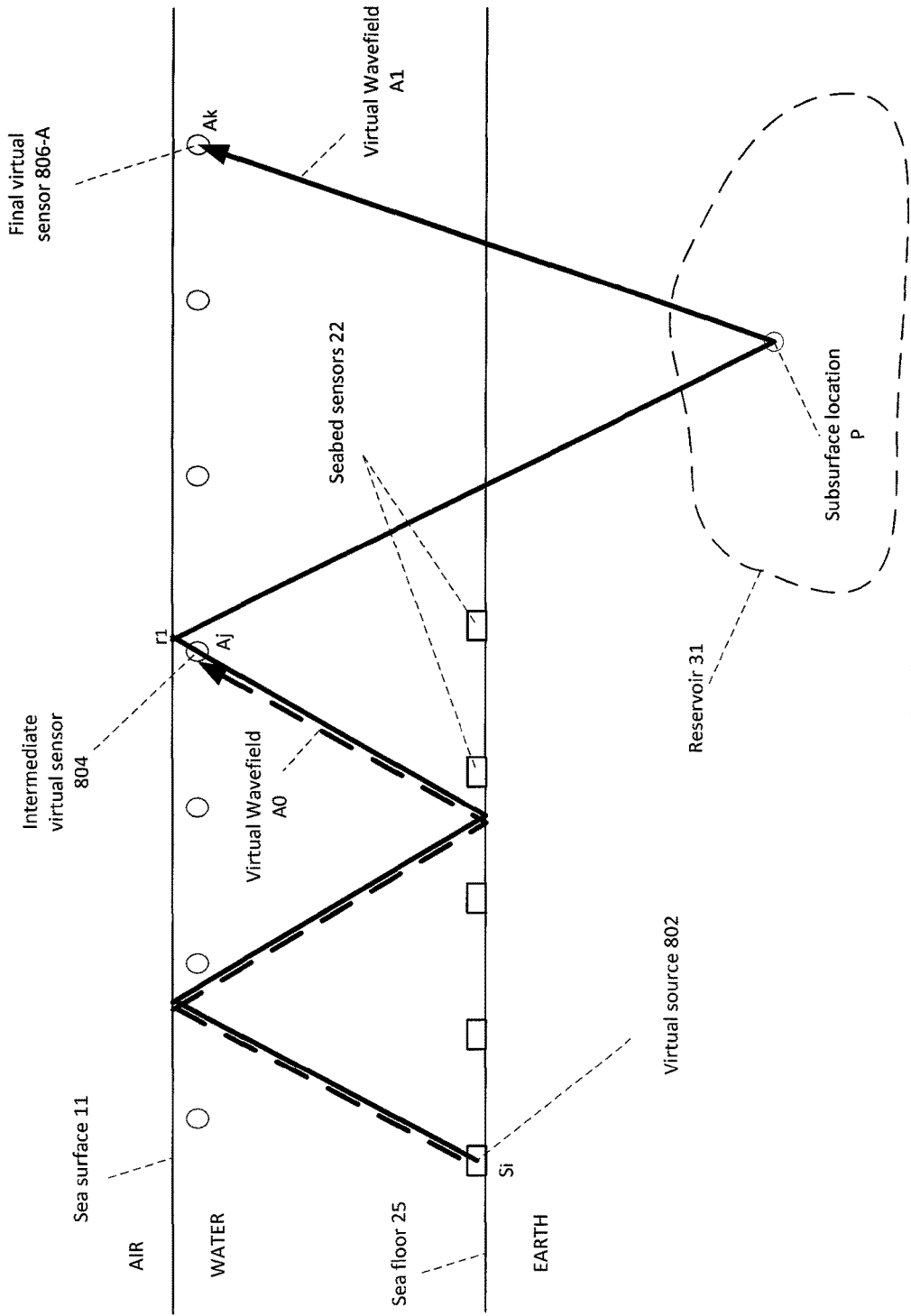
FIG. 8B depicts virtual wavefields after reversal of source and sensor definitions of FIG. 8A in accordance with an embodiment of the invention.

Per step 706, the source and sensor definitions of wavefield A0 may be interchanged to obtain virtual wavefield A0, and source and sensor definitions of wavefield A1 may be interchanged to obtain virtual wavefield A1. FIG. 8B depicts virtual wavefields after reversal of source and sensor definitions of FIG. 8A in accordance with an embodiment of the invention. As depicted in FIG. 8B, virtual wavefield A0 originates at virtual source location 802 at location Si, travels upward to be reflected downward by the sea surface 11, travels downward until reflected upward by the sea floor 25, and travels upward to be detected by the first (intermediate) virtual sensor 804 at location $A_j$. As further depicted, virtual wavefield A1 originates at virtual source location 802 at location Si, travels upward to be reflected downward by the sea surface 11, travels downward until reflected upward by the sea floor 25, travels upward to be reflected downward at reflection location $r_1$, travels downward to be reflected upward at subsurface location P, and travels upward to be detected by the second (final) virtual sensor 806-A at location $A_k$.

Per step 708, the subsurface location P in the reservoir 31 may be imaged, either using a deconvolution or cross-correlation imaging process. The resultant image data and other pertinent data may be stored in a tangible medium so as to be provided as a geophysical data product.

Figure 8C:
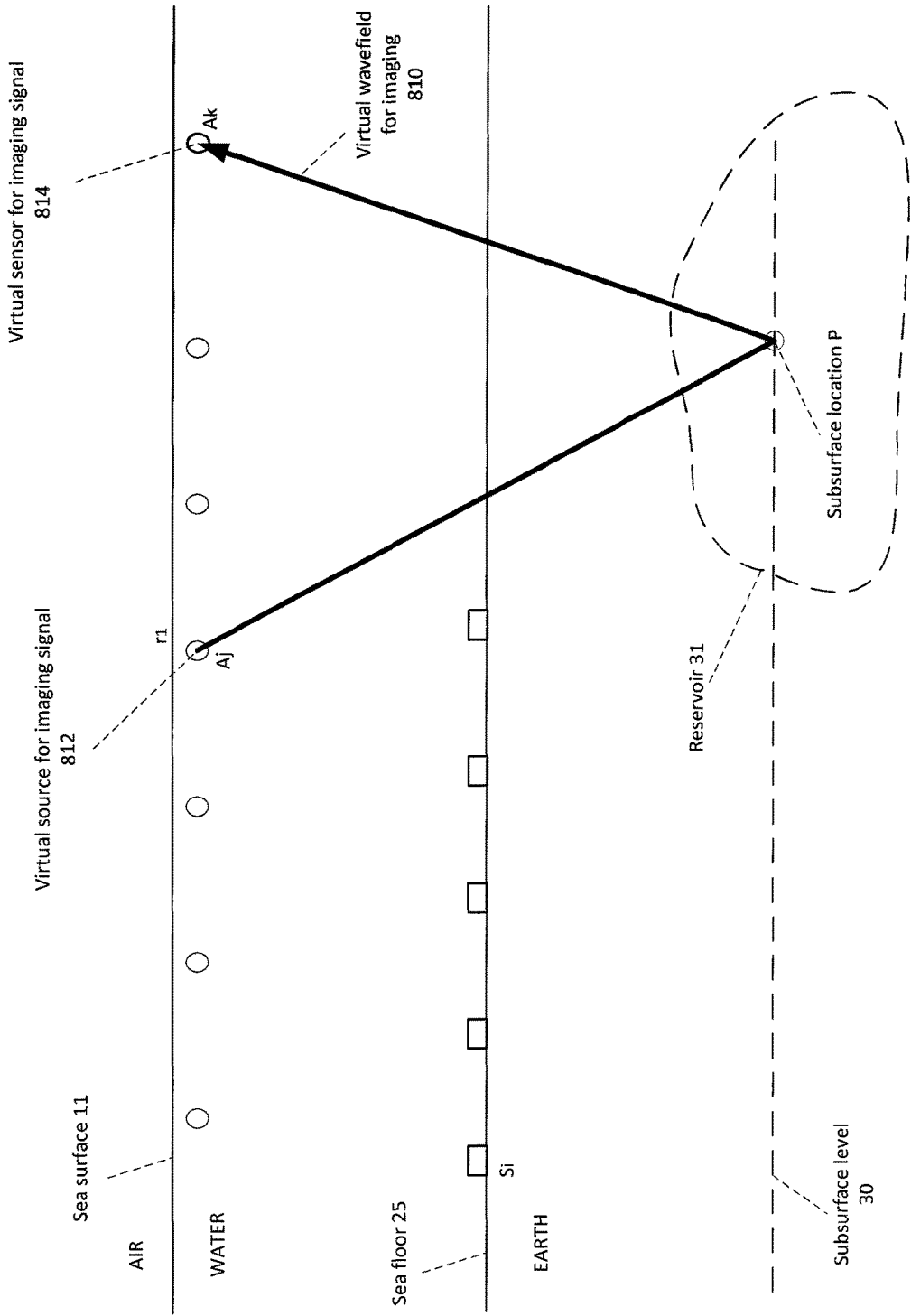
FIG. 8C depicts the virtual wavefield utilized for imaging the subsurface location (P) at the first time in accordance with an embodiment of the invention.

In one embodiment, the geophysical analysis equipment may be configured to deconvolve virtual wavefield A1 using virtual wavefield A0 to obtain deconvolved virtual wavefield A1/A0. The deconvolved virtual wavefield A1/A0 may be effectively used as the imaging wavefield signal 810. As depicted in FIG. 8C, the imaging wavefield signal 810 may be considered as originating at a virtual source 812 at location $A_j$ (which is effectively the same as, or made to correspond with, $r_1$), traveling downward to be reflected upward at the subsurface location P, and traveling upward to be detected by the virtual sensor 814 at location $A_k$.

In an alternate embodiment, the geophysical analysis equipment (on vessel or on shore) may be configured to perform cross-correlation in order to image subsurface location P. In this embodiment, a first data signal may be the virtual data signal received at the first virtual sensor at location $A_j$, and a second data signal may be the virtual data signal received at the second virtual sensor at location $A_k$. The cross-correlation of the first data signal and the second data signal may provide the medium response (i.e., the Green's function) of the subsurface location P. The result is similar to imaging using a virtual source-receiver pair, where the virtual source 812 and virtual receiver 814 (shown in FIG. 8C) are located at the positions of the first and second virtual sensors, respectively.

Figure 8D:
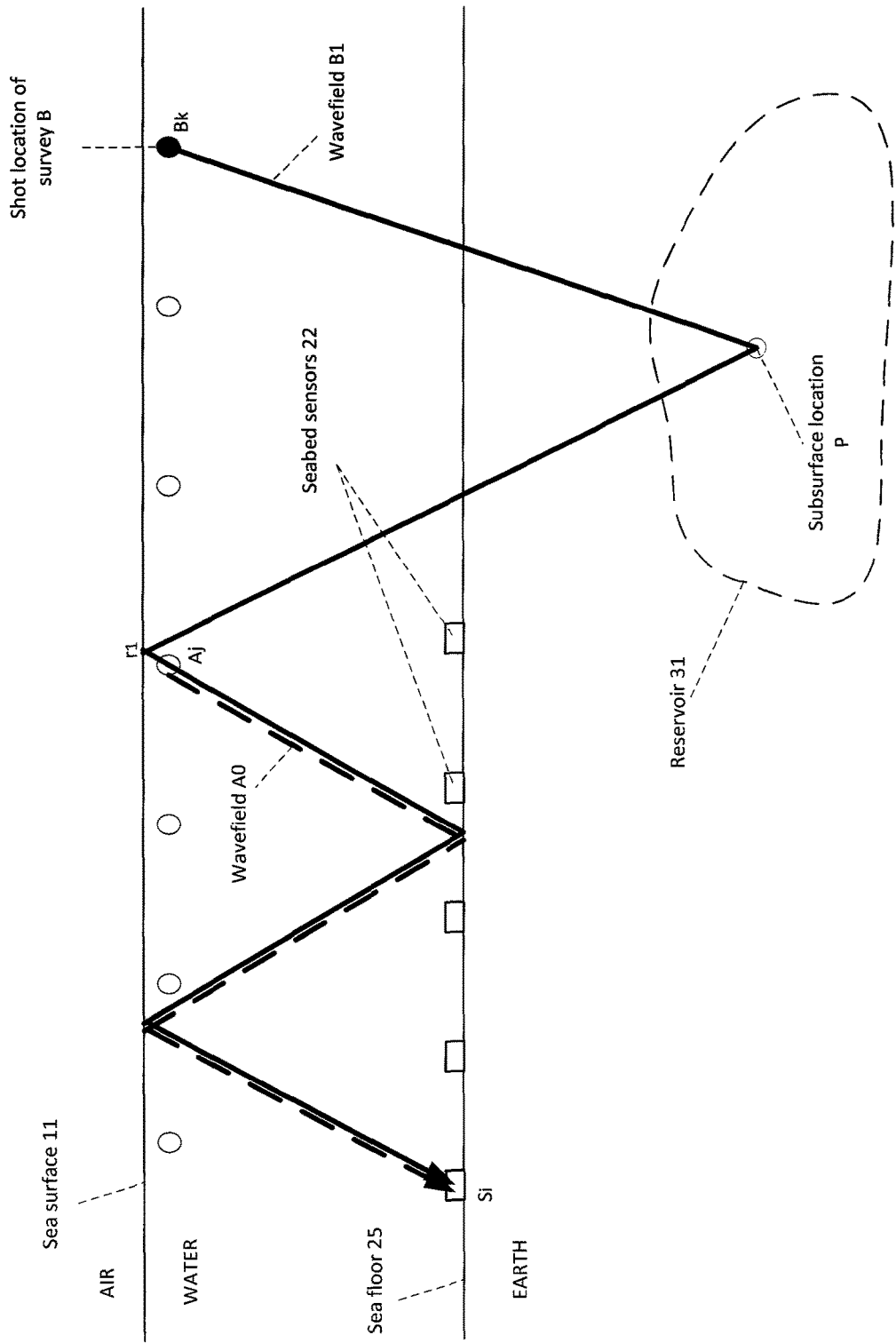
FIG. 8D depicts a wavefield (B1) from a second seismic survey (B) at a second time that is utilized in combination with a wavefield (A0) from the first seismic survey (A) to image the subsurface location (P) at the second time in accordance with an embodiment of the invention.

Per step 712, after a first time gap, a second marine seismic survey (survey B) may be performed. The performance of survey B involves generating seismic signals at a second set of positions and recording a second set of received signals. Survey B may use an array of seabed sensors at the same positions as the array used in survey A. The seabed sensors in the array for survey B may be the same sensors as used for survey A, or the seabed sensors in the array for survey B may be redeployed into the same positions as the sensors used for survey A. In an exemplary implementation, survey B may use a sparser shot pattern than survey A. One exemplary shot location $B_k$ of the second survey (survey B) is shown in FIG. 8D. The shot location $B_k$ of survey B is at the same location, or effectively the same location, as the shot location $A_k$ of survey A.

Per step 714, after separating up-going and down-going wavefields, wavefields A0 of survey A and B1 from survey B are selected. As depicted in FIG. 8D, the two wavefields A0 and B1 originate at different shot locations and end at the same sensor position. The selected wavefield B1 originates at shot location $B_k$ from survey B and travels downward. Wavefield B1 reflects from subsurface point P in the reservoir 31 so as to travel upward, then reflects from point $r_1$ of the sea surface 11 so as to travel downward. Wavefield B1 may then reflect from the sea floor 25 so as to travel upward, then reflect from the sea surface 11 again to travel downward until it is detected by a seabed sensor at the seabed position $S_i$. The selected wavefield A0 originates at shot location $A_j$ and travels downward. Wavefield A0 may reflect from the sea floor 25 so as to travel upward, then reflect from the sea surface 11 to travel downward until it is detected by the seabed sensor at the same seabed position $S_i$ as that which detected wavefield B1. Note that the first sea-surface reflection point $r_1$ of wavefield B1 may be located at shot location $A_j$ from survey A0. Alternatively, a wavefield interpolation process may be performed to obtain a correspondence between the first sea-surface reflection point $r_1$ of wavefield B1 and the shot location $A_j$ from survey A0.

Figure 8E:
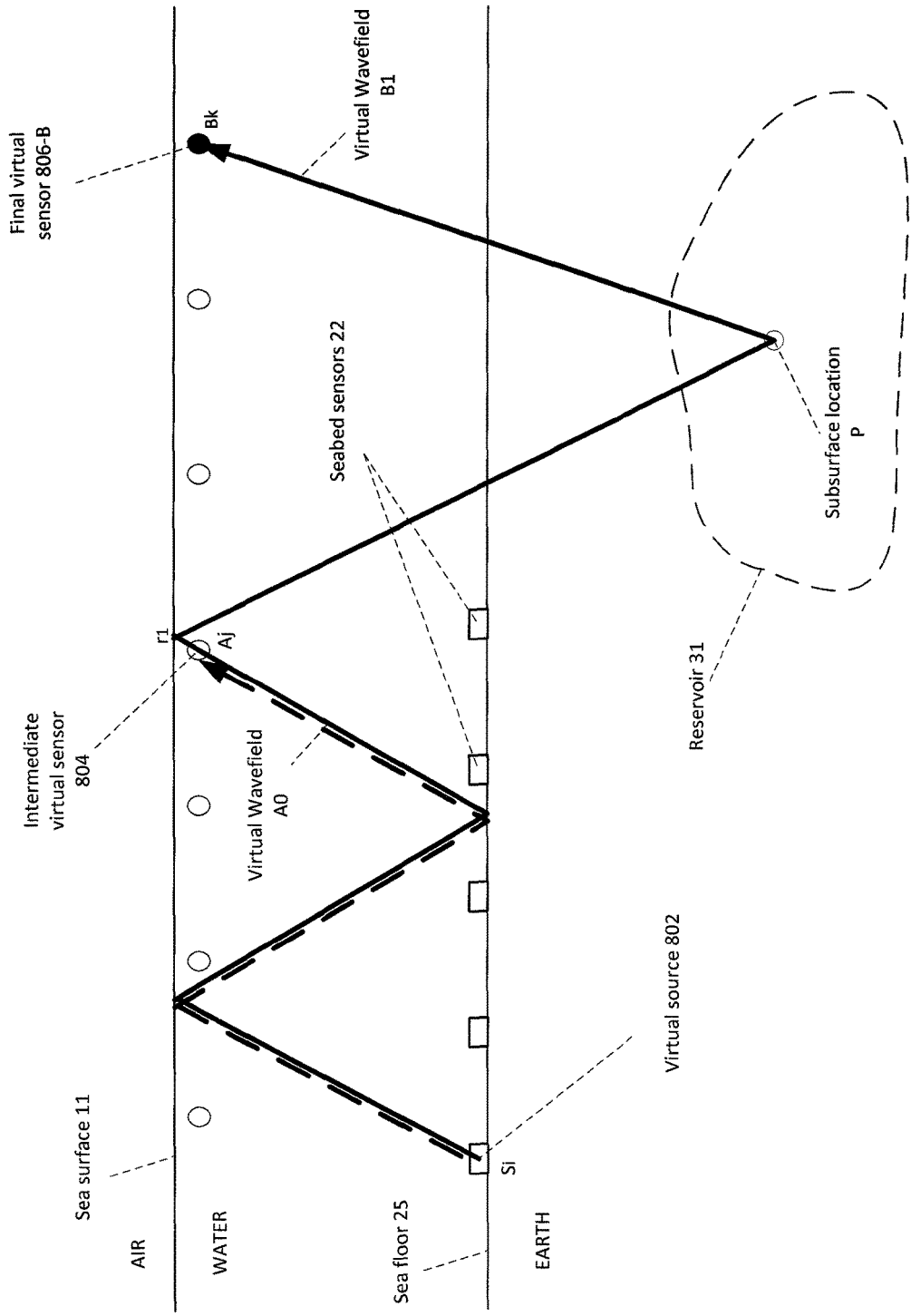
FIG. 8E depicts virtual wavefields after reversal of source and sensor definitions of FIG. 8D in accordance with an embodiment of the invention.

Per step 716, the source and sensor definitions of wavefield A0 may be interchanged to obtain virtual wavefield A0, and source and sensor definitions of wavefield B1 may be interchanged to obtain virtual wavefield B1. FIG. 8E depicts virtual wavefields after reversal of source and sensor definitions of FIG. 8D in accordance with an embodiment of the invention. As depicted in FIG. 8E, virtual wavefield A0 originates at virtual source location 802 at location Si, travels upward to be reflected downward by the sea surface 11, travels downward until reflected upward by the sea floor 25, and travels upward to be detected by the first (intermediate) virtual sensor 804 at location $A_j$. As further depicted, virtual wavefield B1 originates at virtual source location 802 at location Si, travels upward to be reflected downward by the sea surface 11, travels downward until reflected upward by the sea floor 25, travels upward to be reflected downward at reflection location $r_1$, travels downward to be reflected upward at subsurface location P, and travels upward to be detected by the second (final) virtual sensor 806-B at location $B_k$.

Per step 718, the subsurface location P in the reservoir 31 may be imaged, either using a deconvolution or cross-correlation imaging process. Comparison may then be made of the current image data of the subsurface location P generated in step 718 against the previous image data of the subsurface location P generated in step 708. The comparison may involve generating difference data by taking a difference between the current and previous image data. The resultant image data, difference data, and other pertinent data may be stored in a tangible medium so as to be provided as a geophysical data product.

Figure 8F:
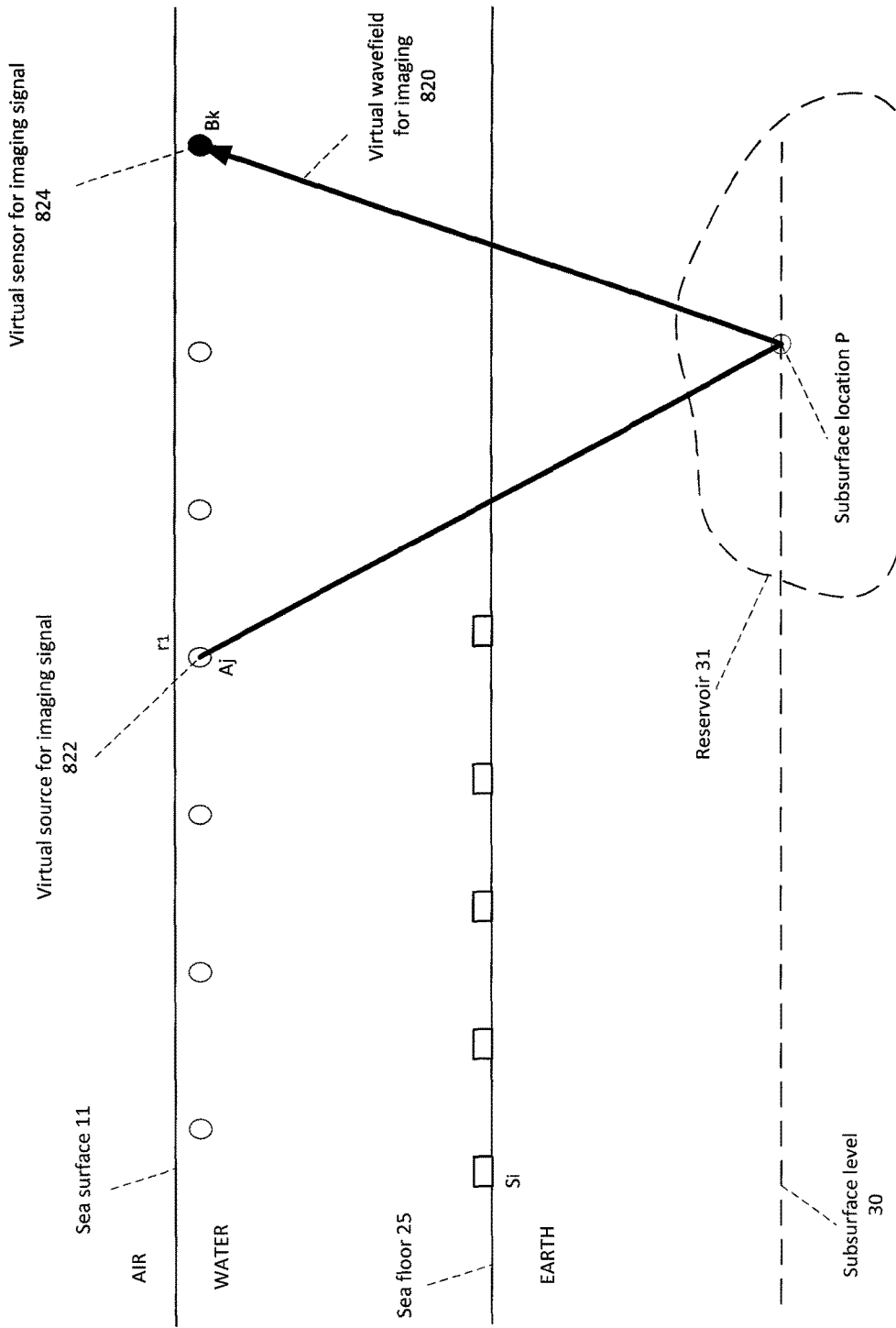
FIG. 8F depicts the virtual wavefield utilized for imaging the subsurface location (P) at the second time in accordance with an embodiment of the invention.

In one embodiment, the geophysical analysis equipment (on vessel or on shore), which uses a computer system to process the seismic data, may be configured to deconvolve virtual wavefield B1 using virtual wavefield A0 to obtain deconvolved virtual wavefield B1/A0. The deconvolved virtual wavefield B1/A0 may be effectively used as the imaging wavefield signal 820. As depicted in FIG. 8F, the imaging wavefield signal 820 may be considered as originating at a virtual source 822 at location $A_j$ (which is effectively the same as, or made to correspond with, $r_1$), traveling downward to be reflected upward at the subsurface location P, and traveling upward to be detected by the virtual sensor 824 at location $B_k$.

In an alternate embodiment, the geophysical analysis equipment (on vessel or on shore), which uses a computer system to process the seismic data, may be configured to perform cross-correlation in order to image subsurface location P. In this embodiment, a first data signal may be the virtual data signal received at the first virtual sensor at location $A_j$, and a second data signal may be the virtual data signal received at the second virtual sensor at location $B_k$. The cross-correlation of the first data signal and the second data signal may provide the medium response (i.e., the Green's function) of the subsurface location P. The result is similar to imaging using a virtual source-receiver pair, where the virtual source 822 and virtual receiver 824 (shown in FIG. 8F) are located at the positions of the first and second virtual sensors, respectively.

Figure 8G:
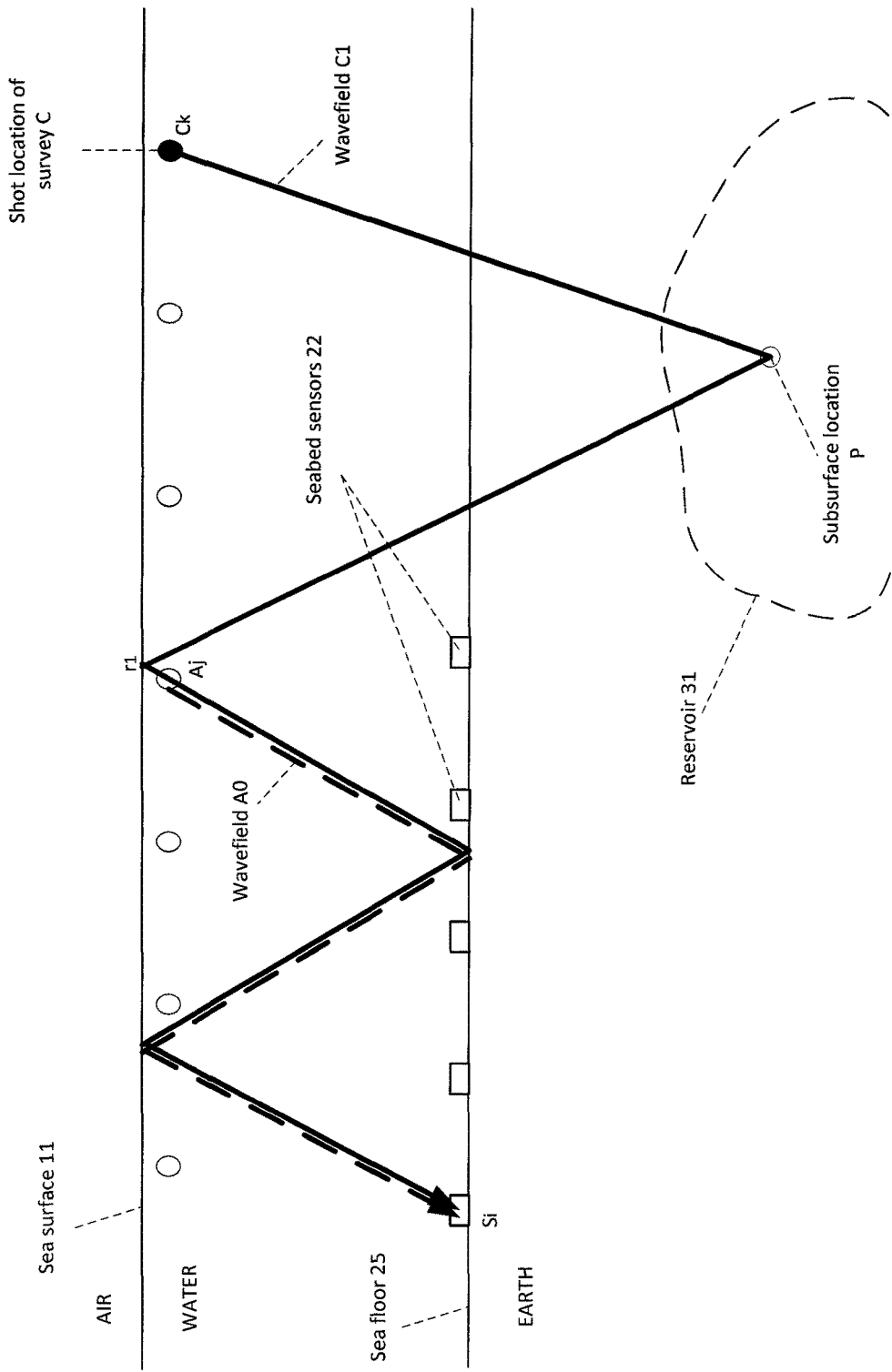
FIG. 8G depicts a wavefield (C1) from a third seismic survey (C) at a third time that is utilized in combination with a wavefield (A0) from the first seismic survey (A) to image the subsurface location (P) at the third time in accordance with an embodiment of the invention.

Per step 722, after a second time gap, a third marine seismic survey (survey C) may be performed. The performance of survey C involves generating seismic signals at a third set of positions and recording a third set of received signals. Survey C may use an array of seabed sensors at the same positions as the array used in survey A. The seabed sensors in the array for survey C may be the same sensors as used for survey A, or the seabed sensors in the array for survey C may be redeployed into the same positions as the sensors used for survey A. In an exemplary implementation, survey C may use a sparser shot pattern than survey A. One exemplary shot location $C_k$ of the third survey (survey C) is shown in FIG. 8G. The shot location $C_k$ of survey C is at the same location, or effectively the same location, as the shot location $A_k$ of survey A.

Per step 724, after separating up-going and down-going wavefields, wavefields A0 of survey A and C1 from survey C are selected. As depicted in FIG. 8G, the two wavefields A0 and C1 originate at different shot locations and end at the same sensor position. The selected wavefield C1 originates at shot location $C_k$ from survey C and travels downward. Wavefield C1 reflects from subsurface point P in the reservoir 31 so as to travel upward, then reflects from point $r_1$ of the sea surface 11 so as to travel downward. Wavefield C1 may then reflect from the sea floor 25 so as to travel upward, then reflect from the sea surface 11 again to travel downward until it is detected by a seabed sensor at seabed position $S_i$. The selected wavefield A0 originates at shot location $A_j$ and travels downward. Wavefield A0 may reflect from the sea floor 25 so as to travel upward, then reflect from the sea surface 11 to travel downward until it is detected by the seabed sensor at the same seabed position $S_i$ as that which detected wavefield C1. Note that the first sea-surface reflection point $r_1$ of wavefield C1 may be located at shot location $A_j$ from survey A0. Alternatively, a wavefield interpolation process may be performed to obtain a correspondence between the first sea-surface reflection point $r_1$ of wavefield C1 and the shot location $A_j$ from survey A0.

Figure 8H:
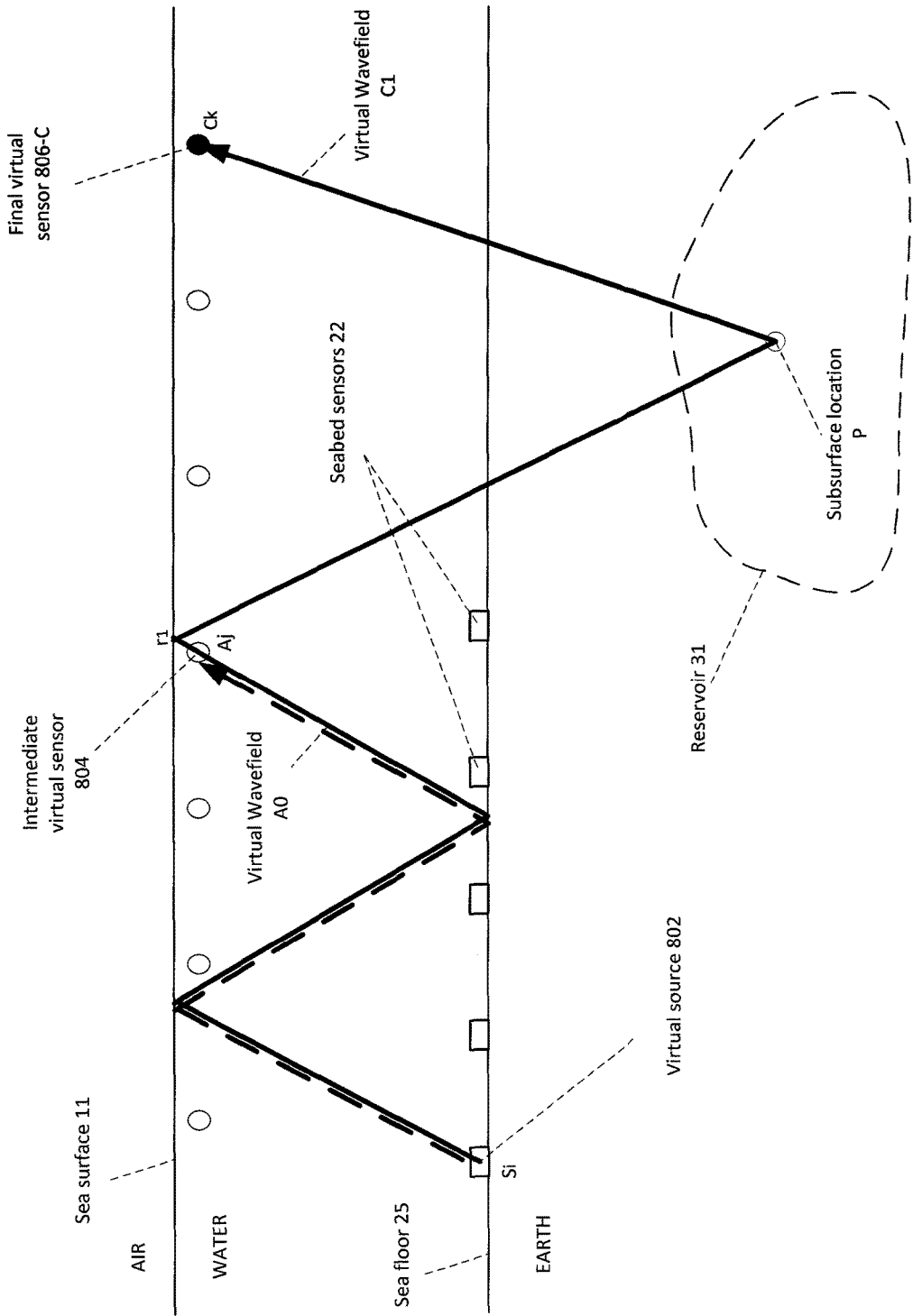
FIG. 8H depicts virtual wavefields after reversal of source and sensor definitions of FIG. 8G in accordance with an embodiment of the invention.

Per step 726, the source and sensor definitions of wavefield A0 may be interchanged to obtain virtual wavefield A0, and source and sensor definitions of wavefield C1 may be interchanged to obtain virtual wavefield C1. FIG. 8H depicts virtual wavefields after reversal of source and sensor definitions of FIG. 8G in accordance with an embodiment of the invention. As depicted in FIG. 8H, virtual wavefield A0 originates at virtual source location 802 at location Si, travels upward to be reflected downward by the sea surface 11, travels downward until reflected upward by the sea floor 25, and travels upward to be detected by the first (intermediate) virtual sensor 804 at location $A_j$. As further depicted, virtual wavefield C1 originates at virtual source location 802 at location Si, travels upward to be reflected downward by the sea surface 11, travels downward until reflected upward by the sea floor 25, travels upward to be reflected downward at reflection location $r_1$, travels downward to be reflected upward at subsurface location P, and travels upward to be detected by the second (final) virtual sensor 806-C at location $C_k$.

Per step 728, the subsurface location P in the reservoir 31 may be imaged, either using a deconvolution or cross-correlation imaging process. Comparison may then be made of the current image data of the subsurface location P generated in step 728 against the previous image data of the subsurface location P generated in step 708 or 718. The comparison may involve generating difference data by taking a difference between the current and previous image data. The resultant image data, difference data, and other pertinent data may be stored in a tangible medium so as to be provided as a geophysical data product.

Figure 8I:
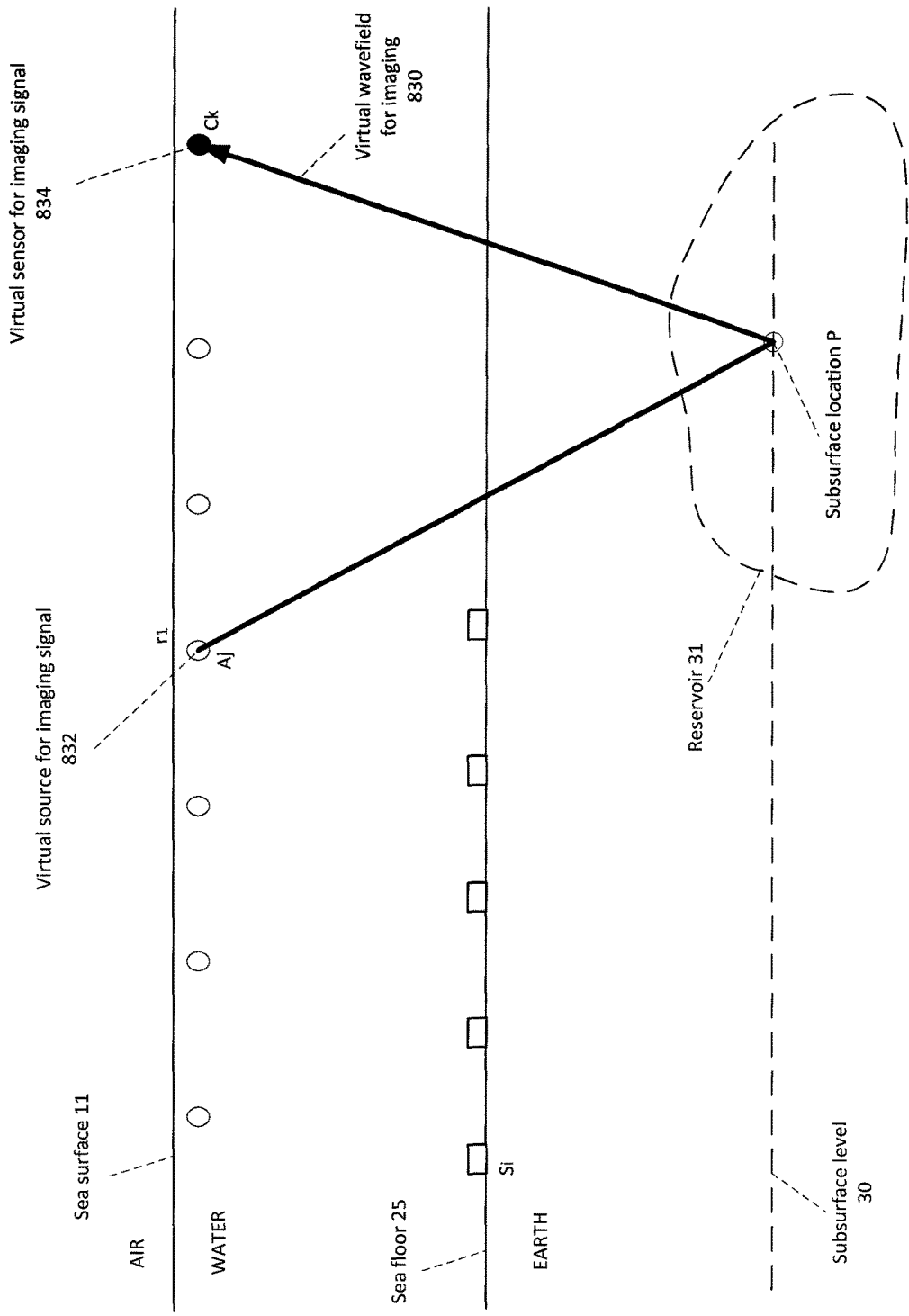
FIG. 8I depicts the virtual wavefield utilized for imaging the subsurface location (P) at the third time in accordance with an embodiment of the invention.

In one embodiment, the geophysical analysis equipment (on vessel or on shore), which uses a computer system to process the seismic data, may be configured to deconvolve virtual wavefield C1 using virtual wavefield A0 to obtain deconvolved virtual wavefield C1/A0. The deconvolved virtual wavefield C1/A0 may be effectively used as the imaging wavefield signal 830. As depicted in FIG. 8I, the imaging wavefield signal 830 may be considered as originating at a virtual source 832 at location $A_j$ (which is effectively the same as, or made to correspond with, $r_1$), traveling downward to be reflected upward at the subsurface location P, and traveling upward to be detected by the virtual sensor 834 at location $C_k$.

In an alternate embodiment, the geophysical analysis equipment (on vessel or on shore), which uses a computer system to process the seismic data, may be configured to perform cross-correlation in order to image subsurface location P. In this embodiment, a first data signal may be the virtual data signal received at the first virtual sensor at location $A_j$, and a second data signal may be the virtual data signal received at the second virtual sensor at location $C_k$. The cross-correlation of the first data signal and the second data signal may provide the medium response (i.e., the Green's function) of the subsurface location P. The result is similar to imaging using a virtual source-receiver pair, where the virtual source 832 and virtual receiver 834 (shown in FIG. 8I) are located at the positions of the first and second virtual sensors, respectively.

The method 700 of FIG. 7 may continue with the performance and processing of further surveys (D, E, F, etc.). Each survey and the subsequent processing steps results in a "snapshot" image of the reservoir being monitored.

Note that the time gap between survey A and survey B may be typically of sufficient length for a change to be expected in the state of the reservoir 31. For example, the time gap between surveys A and B may be three months, six months, or a year, or longer. Similarly, the time gap between survey B and survey C may be typically of sufficient length for a change to be expected in the state of the reservoir 31.

For example, the time gap between surveys B and C may be three months, six months, or a year, or longer. And so on for further surveys to monitor a hydrocarbon reservoir over a span of years.

The above-described method 700 of FIG. 7 may be used to efficiently monitor a production reservoir (i.e. perform a 4D survey). The above-described method 700 of FIG. 7 provides greater flexibility for subsequent shooting monitor surveys.

In one use case, while the first survey (survey A) may have a dense shot pattern for detailed 3D imaging, the subsequent surveys (survey B1, survey C, etc.) may have a sparser shot pattern. In a specific implementation, the first survey may be recorded using a dense single shot survey, while the subsequent surveys may be recorded using cost-effective dual-source flip-flop acquisition.

By using the dense shooting geometry of the base-line survey A as the "forward extrapolated" wavefield A0 in combination of different recorded source wavefields A1, B1, C1, etc. as the "backward extrapolated" wavefield, the difference in the images may be used to provide a 4D signal corresponding to reservoir changes within the time gaps between acquisitions. A time-lapse imaging sequence may be defined as: Base (A1/A0); Monitor1 (B1/A0); Monitor2 (C1/A0), etc.

Computer Apparatus

Figure 9:
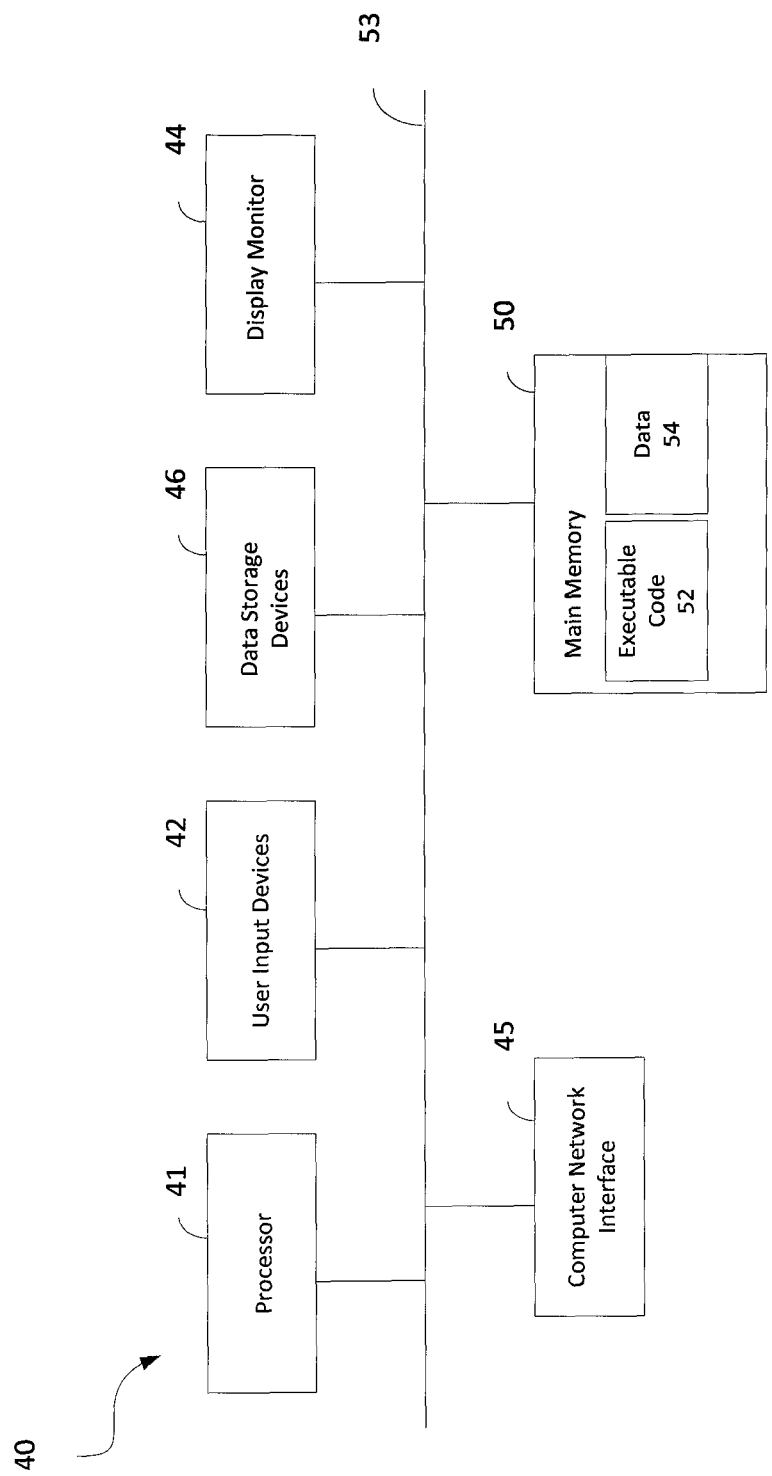
FIG. 9 shows a simplified example of a computer system which may be used in performing processing steps in accordance with an embodiment of the invention.

FIG. 9 shows a simplified example of a computer apparatus 40 which may be used in performing processing steps in accordance with an embodiment of the invention. The computer apparatus 40 may be configured with executable instructions so as to perform the data processing methods described herein. This figure shows just one simplified example of a computer which may be used to perform the data processing methods described herein. Other types of computers may also be employed. As a large amount of seismic data is typically processed, a high-performance cluster of multi-processor server computers may be used in practice. The processing methods may also be performed using a cloud computing system.

As depicted in FIG. 9, the simplified example of the computer apparatus 40 may include a processor 41, such as those from the Intel Corporation of Santa Clara, Calif., for example. The computer apparatus. 40 may have a bus system 43 communicatively interconnecting its various components. The computer apparatus 40 may include one or more user input devices 42 (e.g., keyboard, mouse), a display monitor 44 (e.g., LCD, flat panel monitor, CRT), a computer network interface 45 (e.g., network adapter, modem), and a data storage system which may include one or more data storage devices 46 (e.g., hard drive, solid state memory, optical disk drive, USB memory) and a main memory 50 (e.g., RAM).

In the example shown in this figure, the main memory 50 includes executable code 52 and data 54 stored therein. The executable code 52 may comprise computer-readable program code (i.e., software) components which may be loaded from the data storage device 46 to the main memory 50 for execution by the processor 41. In particular, the executable code 52 may be configured to perform computer-implemented steps in the methods described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method of marine seismic imaging, the method comprising:
    obtaining received signals recorded by an array of sensors in a first seismic survey in which seismic signals were generated at a first set of shot locations;
    obtaining received signals recorded by the array of sensors in a second seismic survey in which seismic signals were generated at a second set of shot locations;
    separating up-going and down-going wavefields for each of the first and second seismic surveys;
    selecting a first wavefield from a first shot location in the first set to a sensor in the array;
    selecting a second wavefield from a second shot location in the second set to the sensor, wherein the second wavefield reflects from a subsurface location, and wherein the first shot location is at a location of a sea-surface reflection of the second wavefield;
    interchanging source and sensor definitions of the first wavefield to obtain a first virtual wavefield;
    interchanging source and sensor definitions of the second wavefield to obtain a second virtual wavefield; and
    processing the first and second virtual wavefields to image the subsurface location.

2. The method of claim 1, wherein the sensors in the array comprise seabed sensors.

3. The method of claim 1, wherein the sensors in the array comprise dual sensors that measure pressure and particle velocity.

4. The method of claim 1, wherein the processing comprises a deconvolution process.

5. The method of claim 1, wherein the processing comprises a cross-correlation process.

6. The method of claim 1, further comprising:
    storing resultant image data in a tangible, non-volatile data storage medium.

7. The method of claim 1, wherein an obstruction blocks one or more of the shot locations in one set of the first and second sets.

8. The method of claim 7, wherein the subsurface location is beneath the obstruction.

9. The method of claim 1, wherein the second set of shot locations has a different spacing than the first set of shot locations.

10. A method of manufacturing a geophysical data product, the method comprising:
    obtaining received signals recorded by an array of sensors in a first seismic survey in which seismic signals were generated at a first set of shot locations;
    obtaining received signals recorded by the array of sensors in a second seismic survey in which seismic signals were generated at a second set of shot locations; and
    using a computer system to process the seismic signals from the first and second sets of shot locations by:
        separating up-going and down-going wavefields for each of the first and second seismic surveys;
        selecting a first wavefield from a first shot location in the first set to a sensor in the array;
        selecting a second wavefield from a second shot location in the second set to the sensor, wherein the second wavefield reflects from a subsurface location, and wherein the first shot location is at a location of a sea-surface reflection of the second wavefield;
        interchanging source and sensor definitions of the first wavefield to obtain a first virtual wavefield;
        interchanging source and sensor definitions of the second wavefield to obtain a second virtual wavefield;
        processing the first and second virtual wavefields to generate image data of the subsurface location; and
        recording the image data of the subsurface location on a tangible data storage medium.

11. The method of manufacturing of claim 10, wherein the sensors in the array comprise seabed sensors.

12. The method of manufacturing of claim 10, wherein the processing comprises a deconvolution process.

13. The method of manufacturing of claim 10, wherein the processing comprises a cross-correlation process.

14. The method of manufacturing of claim 10, wherein an obstruction blocks one or more of the shot locations in the second set.

15. The method of manufacturing of claim 10, wherein the second set of shot locations has a different spacing than the first set of shot locations.

* * * * *